US011139986B2

(12) United States Patent
Khan et al.

(10) Patent No.: US 11,139,986 B2
(45) Date of Patent: Oct. 5, 2021

(54) TRANSACTION AUTHENTICATION BASED ON CONTEXTUAL DATA PRESENTATION

(71) Applicant: ASSA ABLOY AB, Stockholm (SE)

(72) Inventors: Milan Khan, London (GB); François-Eric Michel Guyomarc'h, l'Herault (FR); James William Holland, Braishfield (GB)

(73) Assignee: ASSA ABLOY AB, Stockholm (SE)

( * ) Notice: Subject to any disclaimer, the term of this patent is extended or adjusted under 35 U.S.C. 154(b) by 51 days.

(21) Appl. No.: 16/785,090

(22) Filed: Feb. 7, 2020

(65) Prior Publication Data

US 2020/0177396 A1    Jun. 4, 2020

Related U.S. Application Data

(62) Division of application No. 15/294,573, filed on Oct. 14, 2016, now Pat. No. 10,560,273.

(51) Int. Cl.
*H04L 29/06* (2006.01)
*H04L 9/32* (2006.01)
(Continued)

(52) U.S. Cl.
CPC ....... *H04L 9/3247* (2013.01); *G06Q 20/3223* (2013.01); *G06Q 20/3224* (2013.01);
(Continued)

(58) Field of Classification Search
CPC ... H04L 9/3247; H04L 9/3271; H04L 63/123; G06Q 20/3223; G06Q 20/3224; G06Q 20/3825; G06Q 20/4016; G06Q 20/405
See application file for complete search history.

(56) References Cited

U.S. PATENT DOCUMENTS 9,165,291 B1 * 10/2015 Andersen ............... G06Q 20/40
10,560,273 B2    2/2020 Khan et al.
(Continued)

FOREIGN PATENT DOCUMENTS

| EP | 1207505 | 5/2002 |
|---|---|---|
| EP | 1308871 | 5/2003 |
| WO | 2018069773 | 4/2018 |

OTHER PUBLICATIONS

"U.S. Appl. No. 15/294,573, Non Final Office Action dated Oct. 4, 2018", 17 pgs.
(Continued)

*Primary Examiner* — Jeffrey C Pwu
*Assistant Examiner* — Thong P Truong
(74) *Attorney, Agent, or Firm* — Schwegman Lundberg & Woessner, P.A.

(57) ABSTRACT

Methods, devices, and systems are provided for approving a transaction through an exchange of presented user contextual approval information and approval decryption. The user contextual approval information is generated by a user during a transaction, cryptographically signed, and provided to a transaction server. The user contextual data uniquely describes the transaction to the user and can be employed to aid a user in approving or validating the transaction in a subsequent approval action. In particular, a transaction may present the contextual approval information to a user in the form of an approval challenge message. The approval challenge message may be sent to a known user device via the transaction server in the form of a text or multi-media message. The user may respond to the message with an approval or denial response.

12 Claims, 12 Drawing Sheets

(51) Int. Cl.
*G06Q 20/40* (2012.01)
*G06Q 20/32* (2012.01)
*G06Q 20/38* (2012.01)
*G06Q 50/00* (2012.01)

(52) U.S. Cl.
CPC ....... *G06Q 20/3825* (2013.01); *G06Q 20/405* (2013.01); *G06Q 20/4016* (2013.01); *G06Q 50/01* (2013.01); *H04L 9/3271* (2013.01); *H04L 63/123* (2013.01); *G06Q 2220/00* (2013.01); *H04L 2209/56* (2013.01); *H04L 2209/68* (2013.01)

(56) References Cited

U.S. PATENT DOCUMENTS

| | | |
|---|---|---|
| 2006/0236369 A1 | 10/2006 | Covington et al. |
| 2008/0061961 A1 | 3/2008 | John |
| 2009/0070263 A1 | 3/2009 | Davis et al. |
| 2009/0198617 A1 | 8/2009 | Soghoian et al. |
| 2009/0235339 A1 | 9/2009 | Mennes et al. |
| 2011/0238564 A1 | 9/2011 | Lim et al. |
| 2014/0120961 A1 | 5/2014 | Buck |
| 2015/0112870 A1 | 4/2015 | Nagasundaram et al. |
| 2015/0170149 A1 | 6/2015 | Sharma et al. |
| 2015/0199690 A1 | 7/2015 | Leger |
| 2015/0371228 A1* | 12/2015 | Kershaw ............ G06Q 20/3274 705/77 |
| 2018/0109386 A1 | 4/2018 | Khan et al. |

OTHER PUBLICATIONS

"International Application Serial No. PCT/IB2017/001477, International Search Report dated Jan. 23, 2018", 4 pgs.

"International Application Serial No. PCT/IB2017/001477, Written Opinion dated Jan. 23, 2018", 5 pgs.

"U.S. Appl. No. 15/294,573, Response filed Mar. 4, 2019 to Non Final Office Action dated Oct. 4, 2018", 19 pgs.

"U.S. Appl. No. 15/294,573, Final Office Action dated Mar. 21, 2019", 14 pgs.

"International Application Serial No. PCT/IB2017/001477, International Preliminary Report on Patentability dated Apr. 25, 2019", 8 pgs.

"U.S. Appl. No. 15/294,573, Response filed Jun. 21, 2019 to Final Office Action dated Mar. 21, 2019", 9 pgs.

"U.S. Appl. No. 15/294,573, Notice of Allowance dated Sep. 25, 2019", 5 pgs.

* cited by examiner

US 11,139,986 B2

TRANSACTION AUTHENTICATION BASED ON CONTEXTUAL DATA PRESENTATION

PRIORITY APPLICATION

This application is a divisional of U.S. patent application Ser. No. 15/294,573, filed Oct. 14, 2016, the disclosure of which is incorporated herein in its entirety by reference.

FIELD

The present disclosure is generally directed to authentication systems and more specifically to signature-based approval and authentication of transactions.

BACKGROUND

A transaction may take a number of forms and can include purchases, agreements, and/or other interactions including an exchange of information between entities. Typical daily transactions occur between merchants and purchasers. Due to the large number of transactions occurring over a given time period, a system was developed to prevent or even thwart fraudulent activity. This system is known as transaction data signing. Transaction data signing generally requires a user to verify the particulars associated with a transaction before the transaction can be authorized and completed.

During a mobile authentication process, a message describing the particulars of the transaction is sent to a user's mobile device. The message alerts the user that a verification is required on the particulars of the transaction described before the authentication is completed and the transaction is finalized. In other words, the user is presented with transaction particulars and is prompted to verify the transaction based on the transaction particulars. The user can either approve the transaction or decline the transaction as fraudulent based on the transaction particulars.

SUMMARY

The methods, systems, and devices of the present disclosure provide a contextual transaction approval system that is configured to enhance the information presented to a user device during a transaction. More specifically, the information includes contextual data, or user-provided information, describing the transaction or a context for the transaction. This contextual data helps a user validate the transaction and record this approval by an authentication server, for example. The contextual data may be included in the message to the user alone (e.g., without any other transaction information, as a concise definition of the transaction, etc.) or together with select other transaction information (e.g., amount, account number, merchant information, quantities, etc.). The contextual data may be collected by a backend server to approve the transaction. It is an aspect of the present disclosure that the contextual data may be sent using the same, or similar protocols, as used in transaction data signing.

In some embodiments, the reason, or "why," of the initial alert, and the approval for the rule violation that triggered the initial alert may be provided to the server and may be recorded for future use. For instance, the alert rule that caused the transaction alarm may be identified to the user to assist in making an authentication decision. In some embodiments, the user input that inherently authenticates the specific rule trigger for the alert can be clearly understood and automatically stored in the server for future transactions and alert presentation modification. Thus in the alert above, a user may be notified that the location of the store is in a particular state and that the alert was due to one or more of: 1) a geolocation that is separate from the user's mobile device (e.g., phone, tablet, etc.) OR wearable device, 2) a geolocation that is separate from the user's mobile device AND a wearable device, 3) a geolocation that is unusual for a purchase by the user (e.g., possibly including city, country, continent, etc.), 4) a vendor or merchant that is unusual for the user, and 5) a type of transaction that is unusual for the user, etc.

Among other things, current systems fail to provide the reasoning or rule for the alert and/or the violation of the rule that triggered the alert. In conventional transaction signing, identifying the reason the transaction alert is triggered may be left to the user's imagination or memory. And, if the user wishes to permanently, or temporarily, relax this rule (e.g., when the user is travelling or making transactions outside of the predefined rule), they are not given an opportunity to do so. However, the present disclosure addresses these shortcomings and may present to the user (e.g., via a mobile device display, user interface, etc.) the fact that the alert was triggered by, for example, "a geolocation that is unusual for a purchase from the user (including city, country, continent)." In some embodiments, the present system may prompt the user asking if the rule is still valid, and whether the rule should be relaxed or strictly enforced for a determined period of time (e.g., a number of hours, a number of days, a number of weeks, a number of months, etc.).

The contextual transaction approval system of the present disclosure may take advantage of one or more rules that trigger alerts. These rules may be static and/or dynamic in nature. Examples of such rules may include, but are in no way limited to, what device the user is employing to initiate the transaction, what application is used (e.g., what browser or software binary), credit limit(s), transaction limit(s), transaction speed or frequency (e.g., multiple purchases made over a short or defined period of time, etc.), and transaction history (e.g., buying the same item(s) multiple times, etc.).

Rather than presenting the user with a series of transaction particulars, the contextual transaction approval system of the present disclosure may present a concise and pertinent message (e.g., a contextual approval message) to a user for approval. For example, the contextual transaction approval system may present a message to a user device stating "you are making a purchase from an unusual location (i.e., Pittsburgh, Pa.), did you wish to authorize the purchase of $105.95 from Kmart in Pittsburgh, Pa.?" If the user responds yes (e.g., via a response message, text, or input), a signed response may be sent to the transaction server that "Pittsburgh, Pa." is a valid purchase location (at least temporarily) and this response may be stored at the transaction server for future use. This approach prevents the user from being bothered with needless alerts in the future regarding similar purchases in the now valid purchase location. In other words, the consumer or user is given control over the alerts in an efficient and natural communication flow. As can be appreciated, this process can save bandwidth, process transactions more efficiently, and save processing power, memory storage, and/or other shortcomings associated with conventional transaction signing systems.

In addition, this present disclosure allows the user to add contextual data to describe the transaction, or a context for the transaction, when or at the time the transaction is performed. This contextual data may include text that a user can add to a (e.g., typically financial, etc.) transaction which may then be used when reporting and authenticating the transaction. In some embodiments, the contextual data is bound to the transaction, in that the entire data (e.g., the transaction information and the context data) is cryptographically signed and/or encrypted. The contextual data may be sent to the server (e.g., the transaction server), and can be presented whenever information about the transaction is presented to the end user/customer. For example, a user making a purchase on the Internet may be given the opportunity to label the purchase with contextual data, such as, "Dorothy's Wizard of Oz Shoes," or other symbol, character, text string, etc. Instead of sending only the traditional transactional data, the contextual data provided by the user could be sent to the server (signed by the application private key) and then sent to the mobile application to: (1) present the custom text associated with the contextual data, and (2) validate the private key by decrypting the data with the public key. As can be appreciated, this approach can reduce message payloads and processor requirements (and even reduce user confusion) when sending the condensed message including the contextual data and leaving off the other private data (e.g., where: Kmart, date: 17 July, amount: $105.95) by sending just the encrypted private contextual data or text for approval.

Continuing the example above, whenever the user is presented with information about the transaction, optionally, this contextual data may be presented to a user device and used to authenticate the transaction. Additionally or alternatively, the contextual data may be presented (e.g., in the form of a message, etc.) to the user so the user can use the contextual data to authenticate the transaction. For example, if the user receives an email alert on the user's cell phone asking to authorize this transaction, the contextual data in the form of a message may read as follows: "Would you like to authorize the purchase of Dorothy's Wizard of Oz Shoes for $1,000,000? Yes/no." This presentation of the contextual data provides greater assurance or details that the transaction is valid and is a convenient method to assure the user that this transaction was initiated by the user (e.g., as they conceived of, and may have provided the text "Dorothy's Wizard of Oz Shoes" just seconds ago—during initiation of the transaction). This approach provides quick approval information to the user that is easy to remember and in some cases uniquely generated by the user.

In some embodiments, the contextual data may be presented in reports, invoices, or some other tangible medium such as on-line bill summaries, and printed bills, either as an alternative to the provider's description, or in addition to the service provider's description. For instance, if a user made an online purchase for a tractor using a payment service (e.g., PayPal®, etc.), and entered "John Deer 2005 Cub Cadet tractor," instead of seeing "PayPal * J D Equipment Inc." on the monthly bill, the user may see the contextual data "John Deere 2005 Cub Cadet tractor," on the bill along with any other pertinent contextual data. Additionally or alternatively, in the event of a mobile authentication, the custom text in the contextual data may appear on a request to approve the transaction via the user's mobile device.

In some embodiments, the contextual data may be shared in a social networking manner, or via one or more social networks. This sharing of contextual data may be used in conjunction with or apart from any approval message. In one embodiment, the contextual data may not be included in an approval message or verification but may be used to share information about a transaction to one or more social connections. A transaction service provider may provide a general template to provide "pre" and/or "post" contextual information to facilitate the social networking communication. More specifically, the contextual transaction approval system may add to existing social networking sharing capabilities the ability to pre-populate the communication with the user-defined context information, and to "pre" and/or "post" pend contextual data in the template for the transaction. The template data may be standard text targeted for social networking communication, usually with a placeholder for the user-defined contextual data. The template text may be provided by the transaction server and/or the service provider customer. Additionally or alternatively, the template text may be provided by either the end user or the service provider. This pre/post text may be generated based on a previous social media communication from the user, and in some cases, may be edited or inserted by the user and stored in the user's account profile. Contextual data can be of many different types (i.e., auto-generated or free text, etc.). The different contextual data types may be treated differently to include, for example, different signatures, different sharing rules, different processing rules, etc.

By way of example, a template may be configured to present the following message "I just purchased [ ] from BMW of Austin," which can be targeted or configured for a tweet or post. The contextual data (e.g., user-customized text, etc.) entered by the user to identify the transaction may be substituted in for the "[0]" characters in the actual social media communication or message. In the other example provided above, the contextual data "Wizard of Oz Shoes" may be used to replace the "[ ]" in a template for social media sharing. For instance, a template including the contextual data may provide the final tweet or post as "I just purchased Dorothy's Wizard of Oz Shoes." In some embodiments, rather than bringing up a blank template that displays: "To: Subject: Content:" the "Subject" field may be preloaded with the text "hey, I just bought Dorothy's Wizard of Oz Shoes." Additionally or alternatively, the "Content" field could be preloaded with "I just wanted to share with you the great news, I just bought [ ]! I knew you would want to know" (where the "[ ]" characters are substituted for the contextual data).

It should be appreciated that, while described in conjunction with financial transactions, the present disclosure is not so limited. For instance, the transactions may refer to any transfer of money, trade, guarantee, contractual agreement, legal assignment, assured information exchange, nonrepudiation transaction, access control, mobile topups, enablement or disablement of a device (e.g., unlocking or locking doors, etc.), connection to an Internet of Things (IoT) device, and standard authentication, to name a few.

The phrases "user-generated context," "user-provided context," "user approval contextual data" "custom contextual data", "custom user approval text", "shared contextual data" and variations thereof, as used herein, may be used interchangeably and include any type of information that identifies a transaction to a user or users. The contextual data may be created by a user before, during, or after a transaction is made. In some embodiments, the data or information may be presented (e.g., to a user device, display device, etc.) as part of an authentication, approval, validation, or other authorization of at least a portion of an associated transaction. In one embodiment, this data or information may be shared with one or more social connections (e.g., via a social network, social networking server, etc.) to identify a transaction, or proposed transaction to be, made by a user.

The phrases "transaction information," "transaction particulars," "transaction data," "transaction summary," and variations thereof, as used herein, may be used interchangeably and include any type of information such as item description, terms, cost amount, quantity, account number, sort code, currency code, stock-keeping unit (SKU), payment information, purchaser identification, transaction site identification, and/or other information associated with the transaction and that is not contextual data. The transaction information may refer to any information associated with a transaction that is required to process the transaction other than the contextual data.

In some embodiments, transaction data typically identifies the who does what and when aspects of a transaction between two or more parties. As an example, in a simple financial transaction where there is a transfer of funds from party X to party Y at a given time, the transaction data includes an identification of the parties, the amount of funds transferred, and the given time of the transfer. Contrasting transaction data to transactional contextual data, the use of contextual data herein refers to the information which describes the transaction. The transaction contextual data is associated with the how, why and where of a transaction. The transaction contextual data could be generated by the system or provided by one or more of the transacting parties. Other non-limiting examples of transaction contextual data include: (i) information about the transaction, such as "this purchase is from a store in Las Vegas, for $102.11"; (ii) information about the device where the component was ordered "this is a purchase from a previously unknown laptop"; (iv) information about the behavior context of the purchase (you don't normally buy women's clothing) 'behavior context"; and/or (v) rule-based transaction contextual data "this transaction violates rule xyz for purchases".

The term "user-defined or transactional contextual data", as used herein, may refer to user-defined contextual data or transactional contextual data. The term "rule violation trigger", as used herein, may refer to any rule violation that relates to transaction contextual information that triggers the generation of an approval challenge message.

The term "computer-readable medium," as used herein, may refer to any tangible data storage medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read instructions. When the computer-readable medium is configured as part of a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

As used herein, "credential information" may be any data, set of data, encryption scheme, key, and/or transmission protocol used by a particular device (e.g., a "credential device") to authenticate and/or verify its authenticity with a reader, and/or interrogator.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity may refer to one or more of that entity. As such, the terms "a" (or "an"), "one or more" and "at least one" can be used interchangeably herein. It is also to be noted that the terms "comprising", "including", and "having" can be used interchangeably.

The terms "determine," "calculate," and "compute," and variations thereof, as used herein, may be used interchangeably and include any type of methodology, process, mathematical operation, or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Copyright and Legal Notices

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1A:
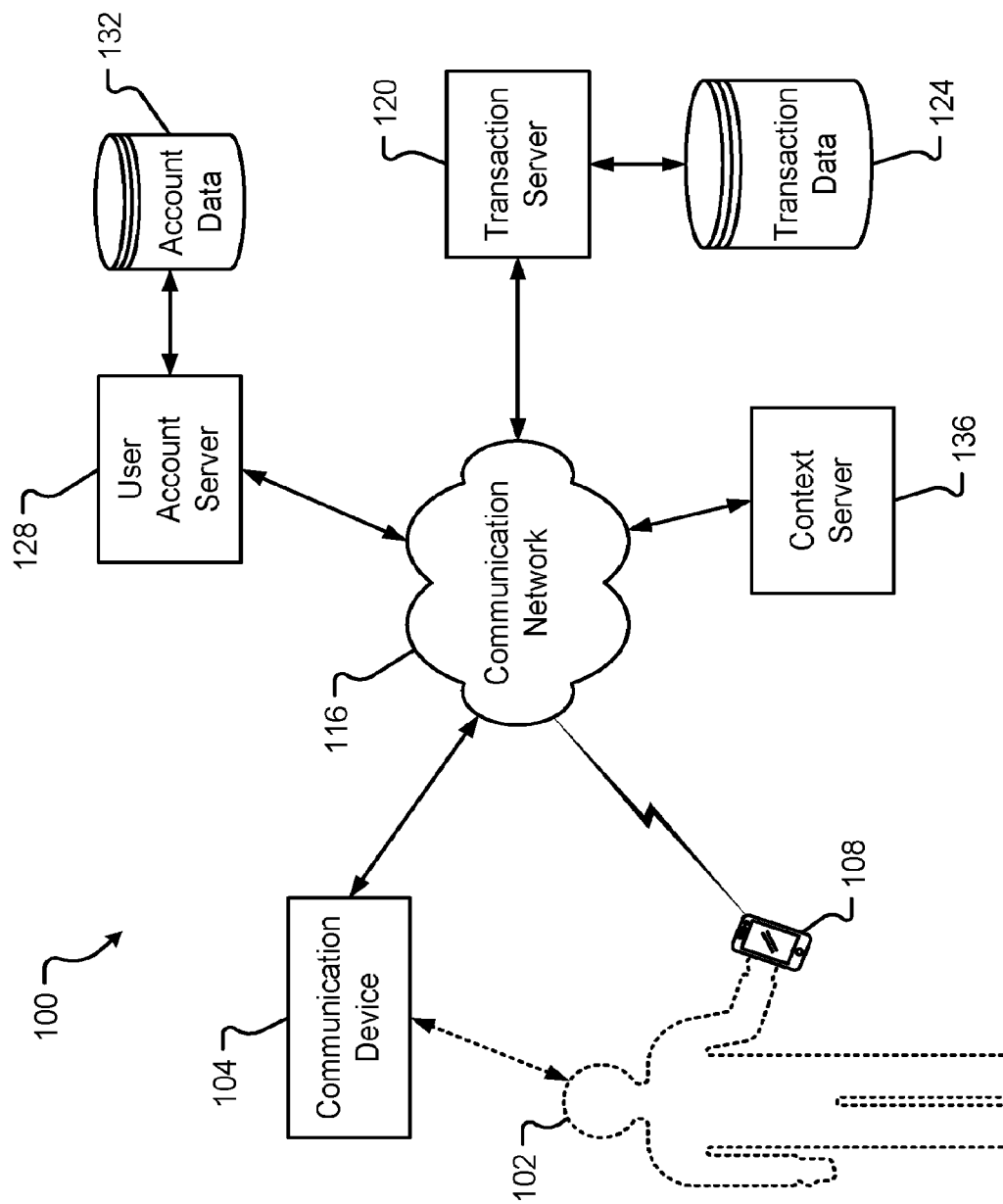
FIG. 1A is a diagram depicting a first configuration of a transaction communication system in accordance with embodiments of the present disclosure.
Figure 1B:
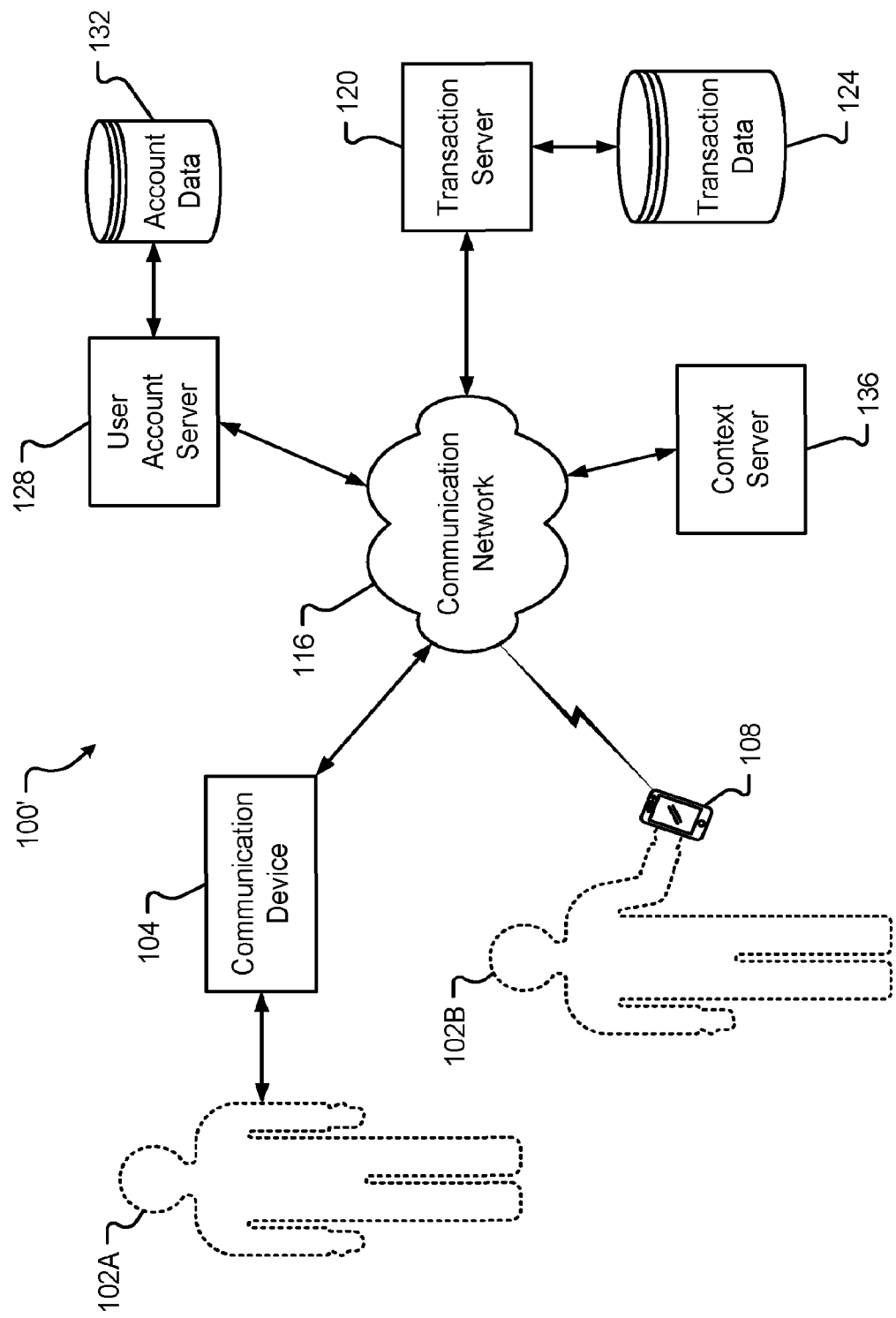
FIG. 1B is a diagram depicting a second configuration of a transaction communication system in accordance with embodiments of the present disclosure.

FIGS. 1A-1B are diagrams depicting different transaction communication system 100, 100' configurations in accordance with embodiments of the present disclosure. The transaction communication systems 100, 100' may include at least one communication device 104, at least one portable device 108, a transaction server 120, transaction data memory 124, a user account server 128, user account data memory 132, and a context server 136. The communication device 104 may be configured to communicate with a transaction server 120 across a communication network 116. The transaction server 120 may be located remotely across a communication network 116 from the communication device 104.

The communication device 104 may correspond to at least one of a smart phone, tablet, personal computer, and/or some other computing device. The communication device 104 may be configured with an operating system ("OS") and at least one communication application. The communication application may be configured to exchange communications between the communication device 104 and another entity (e.g., a transaction server 120, the user account server 128, a context server 136, a portable device 108, another communication device 108, etc.) across the communication network 116. Additionally or alternatively, communications may be sent and/or received via the communication device 104 as a telephone call, a packet or collection of packets (e.g., IP packets transmitted over an IP network), an email message, an instant message ("IM"), an SMS message, an MMS message, a chat, and/or combinations thereof. In some embodiments, the communication device 104 may be associated with one or more users 102, 102A, 102B, in the communication systems 100, 100'.

Similarly, the portable device 108 may correspond to at least one of a smart phone, tablet, personal computer, and/or some other computing device. The portable device 108 may be configured with an OS and at least one communication application. The communication application may be configured to exchange communications (e.g., transaction information, security information, identification information, etc.) between the portable device 108 and another entity (e.g., a transaction server 120, the user account server 128, a context server 136, a portable device 108, another portable device 108, etc.) across the communication network 116. Additionally or alternatively, communications may be sent and/or received via the portable device 108 as a telephone call, a packet or collection of packets (e.g., IP packets transmitted over an IP network), an email message, an instant message ("IM"), an SMS message, an MMS message, a chat, and/or combinations thereof. In some embodiments, the portable device 108 may be associated with one or more users 102, 102B, in the communication systems 100, 100'.

Although the portable device 108 and communication device 104 are shown to be separate devices, it should be appreciated that embodiments of the present disclosure contemplate a single device acting as both the portable device 108 and communication device 104. More particularly, embodiments of the present disclosure contemplate scenarios whereby the user 102 is allowed to initiate a transaction on their portable device 108 (e.g., where the portable device 108 acts as the communication device for purposes of initiating the transaction) and whereby the transaction server 120 sends a message to the portable device 108 requesting that the transaction be approved/validated. In some embodiments where a single device is used, different communication channels may be employed for conducting the transaction versus approving/validating the transaction. For instance, the user 102 may initiate the transaction on their portable device 108 using an application or web browser (thus making the transaction communication channel an IP-based communication channel) whereas the transaction server 120 may send the authentication/validation message to the portable device 108 via SMS or push notification (thus making the approval/validation communication channel a cellular or SMS-based channel). By separating these two channels, the same security benefits of requiring separate devices 104, 108 may be achieved without requiring the user 102 to actually utilize two separate devices for conducting the transaction versus approving/validating the transaction. Additionally or alternatively, a single device 104, 108 may be running at least two separate "firewalled" applications. One of these applications may be used for conducting the transaction, while the other of the applications may be used for approving/validating the transaction. In this example, the two applications may be considered as two separate endpoints. These two separate endpoints may have two separate secure communication channels, even though they are residing on the same physical device 104, 108.

In accordance with at least some embodiments of the present disclosure, the communication network 116 may comprise any type of known communication medium or collection of communication media and may use any type of protocols to transport messages between endpoints. The communication network 116 may include wired and/or wireless communication technologies. The Internet is an example of the communication network 116 that constitutes an Internet Protocol (IP) network consisting of many computers, computing networks, and other communication devices located all over the world, which are connected through many telephone systems and other means. Other examples of the communication network 116 include, without limitation, a standard Plain Old Telephone System (POTS), an Integrated Services Digital Network (ISDN), the Public Switched Telephone Network (PSTN), a Local Area Network (LAN), a Wide Area Network (WAN), a Voice over Internet Protocol (VoIP) network, a Session Initiation Protocol (SIP) network, a cellular network, and any other type of packet-switched or circuit-switched network known in the art. In addition, it can be appreciated that the communication network 116 need not be limited to any one network type, and instead may be comprised of a number of different networks and/or network types. The communication network 116 may comprise a number of different communication media such as coaxial cable, copper cable/wire, fiber-optic cable, antennas for transmitting/receiving wireless messages, and combinations thereof.

The transaction server 120 may include a processor, a memory, and one or more inputs/outputs. The memory of the transaction server 120 may be used in connection with the execution of application programming or instructions by the processor, and for the temporary or long term storage of program instructions and/or data. As examples, the memory may comprise RAM, DRAM, SDRAM, or other solid state memory. The transaction server 120 may include hardware and/or software resources that, among other things, provides the ability to facilitate a transaction between a user 102 and another party or entity (e.g., a merchant, another user, a business, a vendor, etc., and/or combinations thereof).

Additionally or alternatively, the transaction server 120 may communicate with a transaction data memory 124. Like the memory of the access server 120, the transaction data memory 124 may comprise a solid state memory or devices. The transaction data memory 124 may comprise a hard disk drive or other random access memory. In some embodiments, the transaction data memory may store information associated with a transaction including, but in no way limited to, transaction particulars, user contextual data, user preferences, account information, encryption keys, historical transaction data, alert rules, approval rules, alert trigger information, etc., and/or combinations thereof.

The user account server 128 may include a processor, a memory, and one or more inputs/outputs. The memory of the user account server 128 may be used in connection with the execution of application programming or instructions by the processor, and for the temporary or long term storage of program instructions and/or data. As examples, the memory may comprise RAM, DRAM, SDRAM, or other solid state memory. The user account server 128 may be configured to provide one or more user-specific services to a user 102 in the system 100, 100'. User specific services may include social networking services, banking services, financial services, lending services, sensitive information collection services, governmental services, healthcare services, etc., and/or combinations thereof. In the case of a banking example, the user account server 128 may be equivalent to a bank server and the user account on the bank server may include (e.g., in account data memory 132, etc.) one or more statements, credit limits, capital, passwords, user-specific amounts, and/or the like. In some cases, the transaction server 120 and the user account server 128 may be part of a common server or server system owned or operated by a single entity (e.g., a bank, institution, etc.).

Although depicted as being separate components, a context server 136 may be employed within or as part of the transaction server 120 in automatically generating and/or determining a context associated with a user 102. The context determined may be translated into transaction contextual data as described herein. For example, the context server 136 may determine that a user tends to order Swiss chocolate toward the end of the week (e.g., Thursday, Friday, etc.). In this example, the context server 136 may determine that the ordering behavior and/or details are associated with a user context. The context server 136 may then generate contextual data to describe the transaction in accordance with the determined user context. Continuing this example, the contextual data generated by the context server 136 may be "sweets for the weekend." While this contextual data may not be understood by many, a user may identify the contextual data "sweets for the weekend" to apply to the chocolate purchase made. The context server 136 may include a processor, a memory, and one or more inputs/outputs. The memory of the context server 136 may be used in connection with the execution of application programming or instructions by the processor, and for the temporary or long term storage of program instructions and/or data. As examples, the memory may comprise RAM, DRAM, SDRAM, or other solid state memory.

As depicted in FIG. 1A, a user 102 may initiate a transaction across the communication network 116 with at least one entity in the communication system 100 via a communication device 104. This transaction may correspond to a user-initiated-user-approved transaction scenario. Other types of transactions (e.g., enterprise-to-enterprise) may be executed in a similar fashion using similar or identical types of contextual data.

During the transaction, the user 102 provides contextual data that uniquely identifies the order to the user 102 as well as Transaction contextual data. This user-provided contextual data may be provided with or without prompting the user. This contextual data may be signed and/or encrypted and protected for integrity by the communication device 104 and sent across the communication network 116 to the transaction server 120. Upon receiving initiation of the transaction, the transaction server 120 may refer to preferences, rules, and/or triggers stored in a memory (e.g., in transaction data memory 124, etc.) and determine whether the transaction initiated by the communication device 104 requires approval. In the event that the transaction requires approval, the transaction server 120 may send a message to the portable device 108 over the communication network 116. The message may include the user-provided contextual data that serves to identify the transaction to the user 102 for verification and approval. The message may also include transaction contextual data. It is an aspect of the present disclosure that the transaction approval method may operate in reverse to this described manner. For instance, the transaction may be initiated by the portable device 108 and an approval message may be sent to the communication device 104 via the transaction server 120. As described above, the user 102 may also be enabled to use a single device (e.g., portable device 108 or communication device 104) for both initiating the transaction and for approving the transaction. In any event, this and other embodiments of the contextual data and approval message are further described in the present disclosure.

FIG. 1B depicts a transaction communication system 100' having a different transaction-initiation user 102A and transaction-approval user 102B. As illustrated in FIG. 1B, a first user 102A may initiate a transaction across the communication network 116 with at least one entity in the communication system 100' via a communication device 104. The transaction depicted in FIG. 1B may correspond to a first-user-initiated-second-user-approved transaction scenario. During this transaction, the first user 102A may provide user-provided contextual data that uniquely identifies the order or transactional contextual data to the second user 102B. This information may be encrypted by the communication device 104 and sent across the communication network 116 to the transaction server 120. Upon receiving initiation of the transaction, the transaction server 120 may refer to preferences, rules, and/or triggers stored in a memory (e.g., in transaction data memory 124, etc.) and determine whether the transaction initiated by the communication device 104 requires approval. In the event that the transaction requires approval, the transaction may send a message to the portable device 108 of the second user 102B over the communication network 116. The message may include the user-provided contextual data that serves to identify the transaction or transactional contextual data to the first user 102A, the second user 102B, or both 102A, 102B for verification and approval. As can be appreciated, the described transaction approval method may operate in reverse. For instance, the transaction may be initiated by the second user 102B via the portable device 108 and an approval message may be sent to the communication device 104 of the first user 102A via the transaction server 120.

Figure 2:
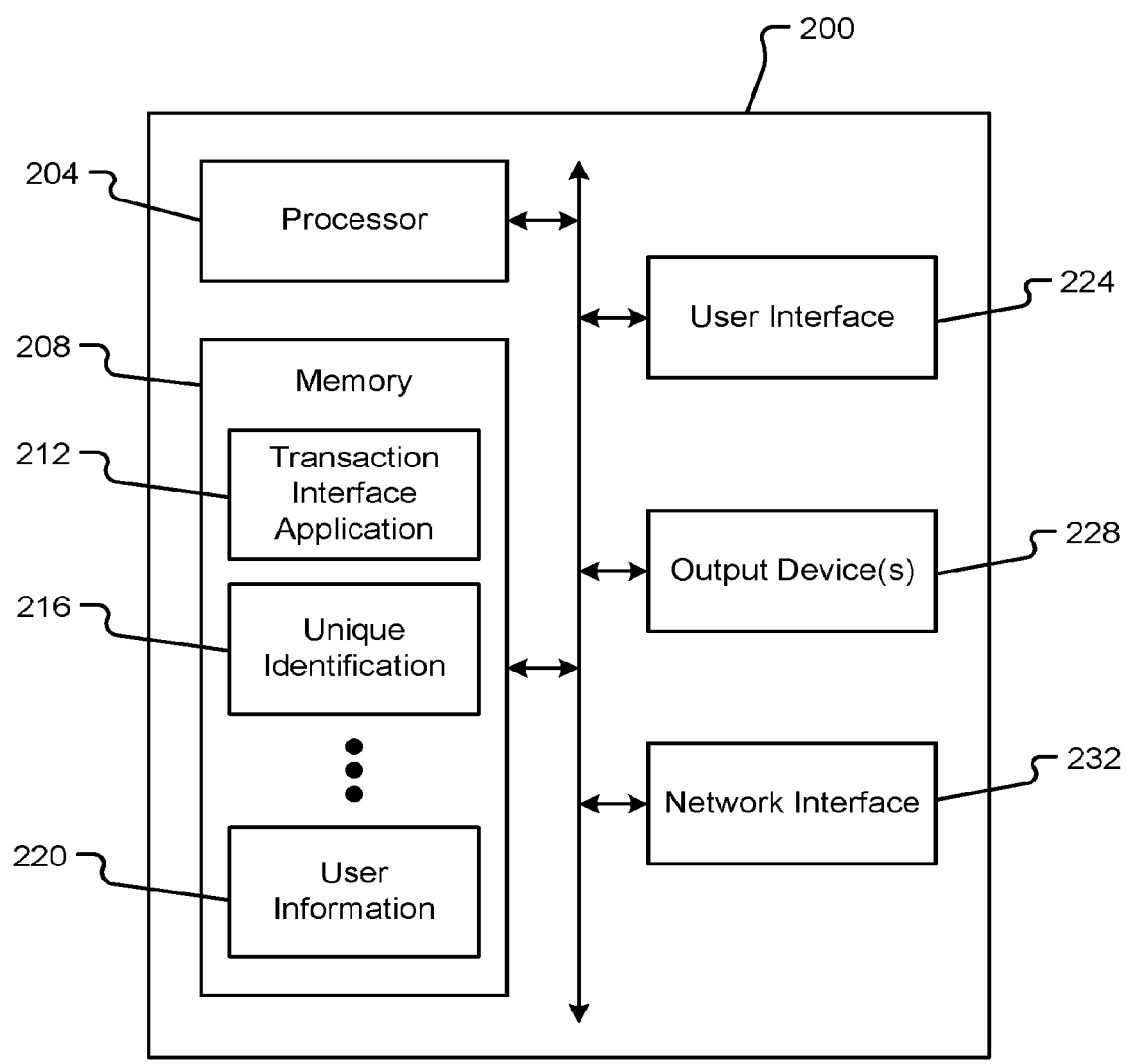
FIG. 2 is a block diagram depicting a communications device or components thereof in accordance with embodiments of the present disclosure.

Referring now to FIG. 2, a block diagram depicting a communications device 200 is shown in accordance with embodiments of the present disclosure. The communications device 200 may correspond to an example of any device (e.g., the communication device 104, the portable device 108, transaction server 120, etc.) in the transaction communication system 100, 100' that is communicatively connected to the communication network 116. The communications device 200 may include one or more components, such as a processor 204, a memory 208, one or more applications or sets of instructions 212 stored in the memory 208 and executed by the processor 204, a user interface 224, at least one output device 228, and a network interface 232. The processor 204 may be an application specific integrated circuit (ASIC), microprocessor, programmable controller, or the like.

The processor 204 may correspond to one or many microprocessors in the communications device 200. In some embodiments, the processor 204 incorporates the functions of the user device's Central Processing Unit (CPU) on a single Integrated Circuit (IC) or a few IC chips. The processor 204 may be a multipurpose, programmable device that accepts digital data as input, processes the digital data according to instructions stored in its internal memory, and provides results as output. The processor 204 implements sequential digital logic as it has internal memory. As with most known microprocessors, the processor 204 may operate on numbers and symbols represented in the binary numeral system.

The memory 208 of the communications device 200 may be used in connection with the execution of application programming or instructions (e.g., transaction interface application 212, etc.) by the processor 204, and for the temporary or long term storage of program instructions and/or data. The memory 208 may contain executable functions that are used by the processor 204 to run other components of the communications device 200. In one embodiment, the memory 208 may be configured to store unique identification information 216. For instance, the unique identification information 216 may include, but is not limited to, unique identifications, manufacturer identification, passwords, keys, encryption schemes, transmission protocols, and the like. In some embodiments, the memory 208 may be configured to store user information 220 including, but in no way limited to, user identification information, user authentication information, user preferences, user account information, login information, and/or the like. In some embodiments, the memory 208 may comprise volatile or non-volatile memory and a controller for the same. Non-limiting examples of memory 208 that may be utilized in the communications device 200 include RAM, ROM, buffer memory, flash memory, solid-state memory, or variants thereof.

In some embodiments, the communications device 200 may include a user interface 224, at least one output device 228, and/or a network interface 232. The user interface 224 may comprise one or more user input devices and/or one or more user output devices. Examples of suitable user input devices that may be included in the user interface 224 include, without limitation, buttons, keyboards, mouse, touch-sensitive surfaces, pen, camera, microphone, etc. In situations where the communications device 200 corresponds to a server, then the user interface 224 may be optional or less complex (e.g., simple buttons and/or lights). Examples of suitable user output devices 228 that may be included in the communications device 228 include, without limitation, display screens, touchscreens, lights, speakers, etc. It should be appreciated that the user interface 224 may also include a combined user input and user output device, such as a touch-sensitive display or the like.

The communications device 200 may be configured to communicate with one or more entities 104, 108, 120, 128, 136 in the communication system 100, 100' via at least one communication channel or multiple communication channels. The network interface 232 may comprise hardware that facilitates communications with other communication devices over the communication network 116. The network interface 232 may include an Ethernet port, a Wi-Fi card, a Network Interface Card (NIC), a cellular interface (e.g., antenna, filters, and associated circuitry), or the like. The network interface 232 may be configured to facilitate a connection between the communications device 200 and the communication network 116 and may further be configured to encode and decode communications (e.g., packets) according to a protocol utilized by the communication network 116. In some cases, the communications device may include a communications module that operates with the network interface 232 to communicate with one or more different systems or devices either remotely or locally to the communications device 200. Thus, the network interface 232 can send or receive messages to or from a communication device 104, portable device 108, transaction server 120, user account server 128, and/or context server 136 or other systems and/or devices. In some embodiments, the communicated information may be provided to, or exchanged with, other components within the communications device 200.

In one embodiment, the communications device 200 may include one or more location sensors. The location sensors may be configured to determine a geographical location and/or position of the communications device 200. In one embodiment, this location may be based on Global Positioning System (GPS) data provided by a GPS module of the communications device 200. In some embodiments, the location of the communications device 200 may be provided based on cell tower data, Wi-Fi information, iBeacon information, and/or some other location information provided by a location module and/or a communications module of the communications device 200. In one embodiment, the authentication of a user may be based at least partially on determining a location of the communications device 200. In some embodiments, one or more features of the communications device 200 may be controlled based on a location and/or state of the communications device 200. It is an aspect of the present disclosure that the location information associated with a communications device 200 (e.g., whether determined from one or more locations sensors, IP addresses, network addresses, etc.) may be provided to a user as part of a contextual approval communication or message.

Figure 3A:
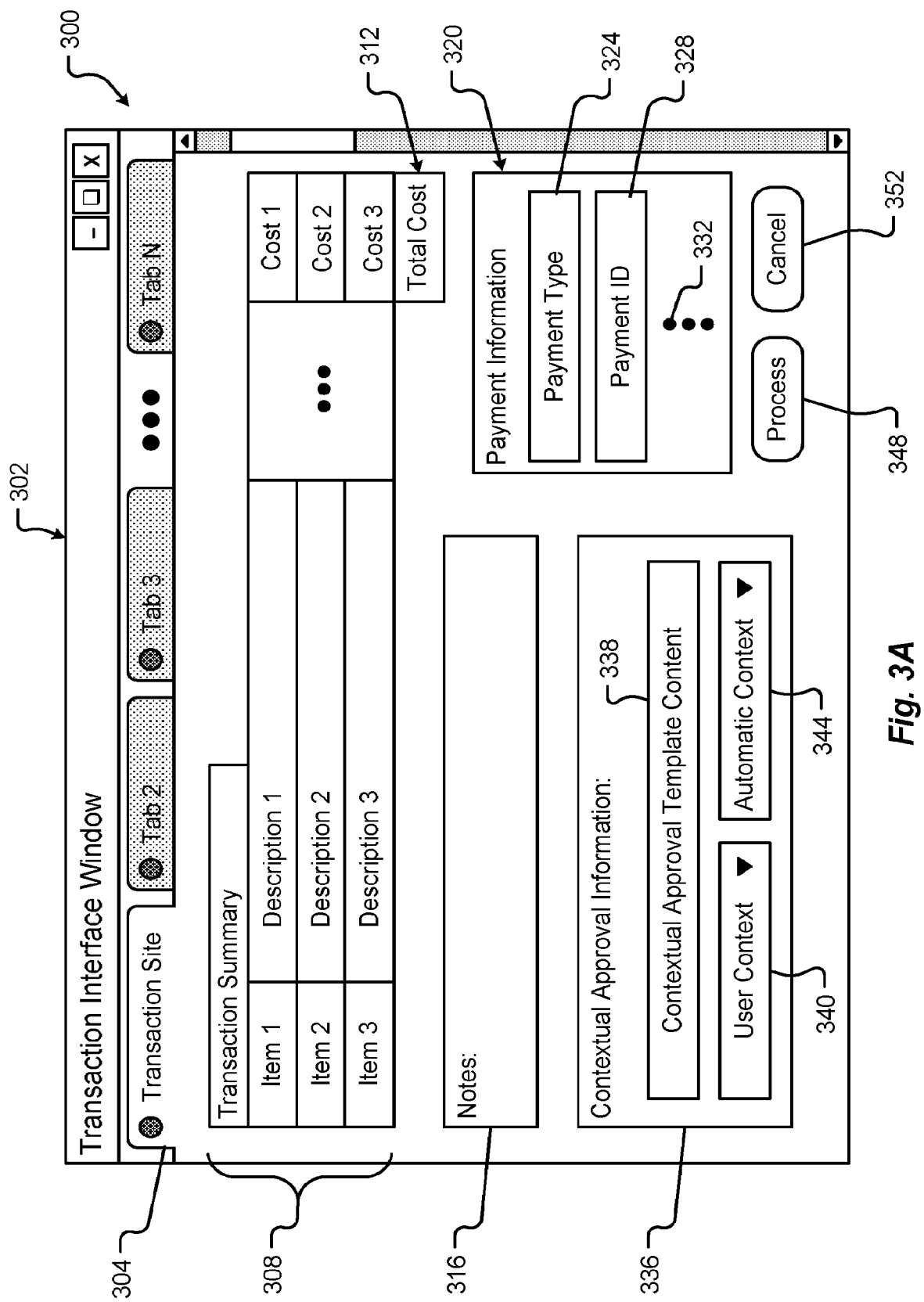
FIG. 3A is a representation of a graphical user interface of a transaction interaction window in accordance with embodiments of the present disclosure.

FIG. 3A is representation of a graphical user interface ("GUI") of a transaction interaction window 300 in accordance with embodiments of the present disclosure. The transaction interaction window 300 may be presented to a display of a communication device 104 or portable device 108 in the system 100, 100' during a transaction. The window 300 may include a header section 302 including various GUI controls, a title or window identifier, and the like. As can be appreciated, the GUI controls may be used to minimize, maximize, resize, and/or close the transaction interaction window 300. In some embodiments, one or more of tabs may be displayed in the window 300 indicating various sections of an application or browser. As illustrated in FIG. 3A, the "Transaction Site" tab 304 is highlighted, or in focus, indicating that the user is in a particular transaction application tab associated with the transaction site.

A typical transaction (e.g., a purchase transaction, etc.) may include a transaction summary 308 showing a group of particulars associated with the transaction. In the purchase transaction example, this group of particulars may include one or more item identifiers, descriptions, and costs. Additionally or alternatively, transaction particulars may include item terms, amount, account number, sort code, currency code, SKU, etc. In some cases, a total cost 312 for the transaction may be displayed. The transaction window 300 may include a notes box 316 configured to store notes associated with the transaction. These notes may be provided by a user, a technician, a site, automatically or manually entered. The notes box 316 can serve as a reminder for some information associated with the order.

In some embodiments, the transaction interaction window 300 may include a payment information area 320. The payment information area 320 may include information or data relevant to a payment or exchange included in the transaction. This information may include a payment type 324 (e.g., credit card, type of card, account, payment service, intermediary account, etc.), a payment ID 328 (e.g., card number, account number, etc.), a payment account name, verification numbers, address, etc. (not shown), and/or more 332.

It is an aspect of the present disclosure that the transaction interaction window 300 may include a contextual approval information area 336. This area 336 may include a contextual approval template content box 338, a user contextual data entry/selection box 340, and/or an automatic contextual data selection box 344. The contextual approval template content box 338 may allow a user 102 to preview a template entry or contextual display of contextual data for use in the approval process or for sharing contextual data associated with a transaction via one or more social networking sites. The user contextual data entry/selection box 340 may allow a user 102 to enter user-defined custom contextual data. As provided herein, the user-defined contextual data may be used in defining or otherwise identifying the transaction to a user during a transaction data signing approval process. For example, a user may enter "fast running shoes" as the contextual data for the transaction in a box, pop-up window, or other data entry field associated with the user contextual data entry/selection box 340 for a running shoe transaction. This user-provided contextual data may identify to the user that the transaction is associated with the purchase of the running shoes or one or more other transaction particulars. While the contextual data may include information that pertains to the transaction particulars, the custom contextual data described herein may not be limited only to transaction-pertinent contextual information. For instance, the custom contextual data may include a custom string or information that is generated by the user to uniquely identify the purchase to the user. In some cases, this custom contextual data may be totally unrelated to the transaction particulars of the transaction. By way of example, a user may be purchasing tickets for a concert and decide to add custom contextual data (e.g., custom contextual approval information, etc.), such as "fun evening of listening." In this example, the custom contextual data provided does not correspond to any transaction particulars but the information may identify the transaction for approval to a user who knows a context associated with the transaction.

In some embodiments, custom contextual data may be automatically generated and/or added to a transaction based on a number of factors, conditions, or input. For example, automatic custom contextual data may be generated by the transaction application, or context server 136, in determining a context for the user. This custom contextual data can include custom text, images, etc., and/or combinations thereof. In one example, a user may not wish to add contextual data via the user contextual data entry/selection box 340 and instead prefer to select the automatic contextual data selection box 344. Upon selecting the automatic contextual data selection box 344, the transaction application may generate automatic custom contextual data associated with the transaction. In any event, the custom contextual data may be based on transaction particulars, user behavior, historical information, unique combinations of information, etc., and/or combinations thereof. For instance, a unique combination of information may include an image (e.g., of a shoe, object, items, etc.) together with text (e.g., "Thinking of Mountains on the Moon," etc.). The image and the text may be displayed to the user to remember during a subsequent, or concurrent, approval process. As provided above, the custom contextual data in the combination of information format may be related or unrelated to the transaction particulars. In any event, the custom contextual data presentation may be defined, custom arranged, and/or otherwise configured by selecting the dropdown arrow associated with the user contextual data selection box 340 or automatic contextual data selection box 344 and structuring the contextual data presentation (as described in conjunction with FIGS. 3B-3C). The window 300 may include additional input buttons 348, 352 to process or cancel a transaction, respectively.

Figure 3B:
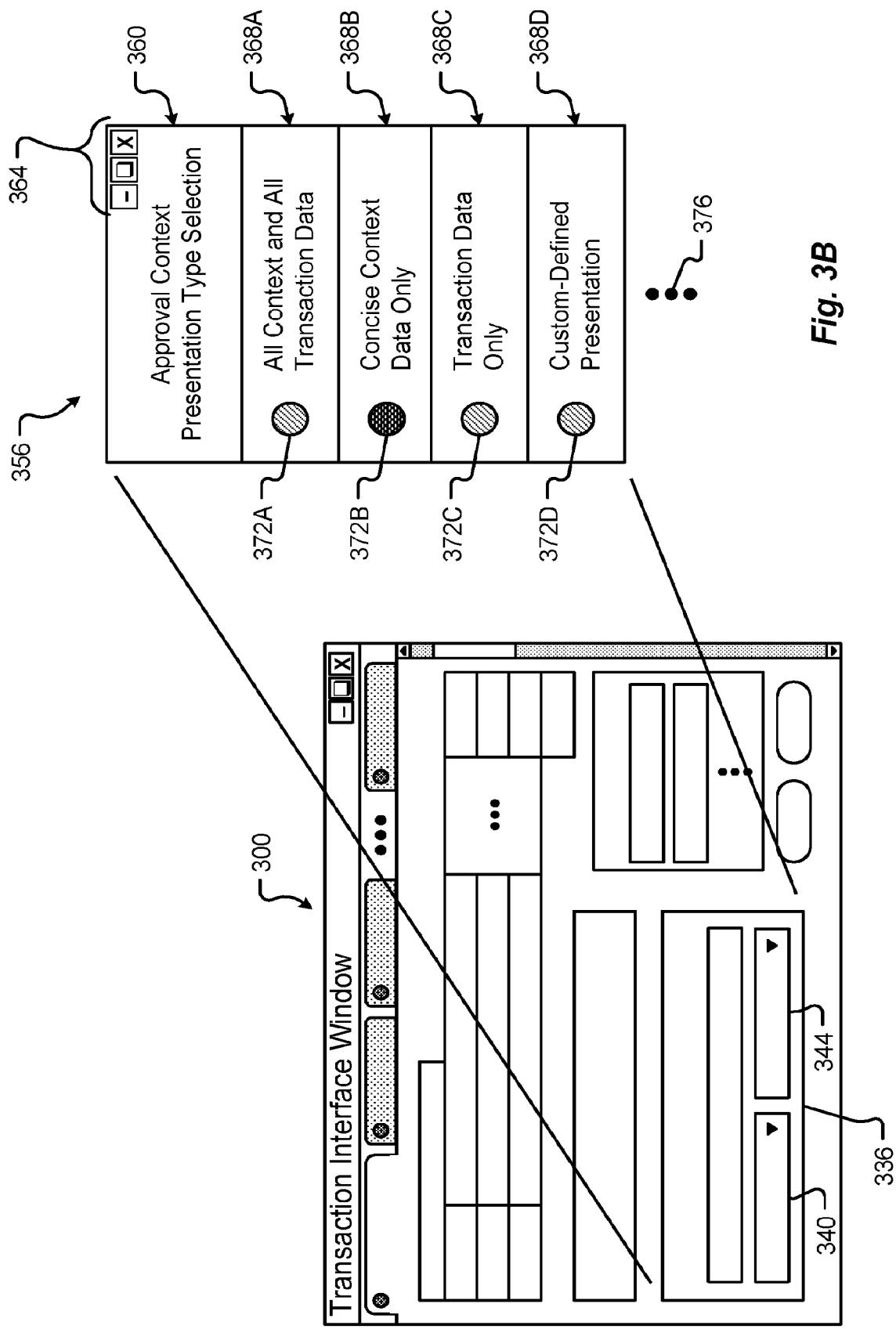
FIG. 3B is a representation of a graphical user interface of a contextual data presentation selection window in accordance with embodiments of the present disclosure.

FIG. 3B is a representation of a GUI of a contextual data presentation selection window 356 in accordance with embodiments of the present disclosure. In some embodiments, the contextual data presentation selection window 356 may be provided, presented, and/or displayed to a communication device 200 upon receiving a selection input from the contextual approval information area 336 of the transaction interaction window 300. By way of example, a user may select to add custom contextual data via the user contextual data selection box 340 and/or the automatic contextual data selection box 344. Once the appropriate box 340, 344 is selected, a popup or other window 356 may be presented to the GUI of the communication device 200. This popup or window 356 may provide additional information and/or selections from which the user may make selections. Similar to the transaction interaction window 300, the contextual data presentation selection window 356 may be presented to a display of a communication device 104 or portable device 108 in the system 100, 100' during a transaction. The window 356 may include one or more GUI controls 364 configured to minimize, maximize, resize, and/or close the window 356. In some embodiments, the contextual data presentation selection window 356 may be presented in response to selecting an option (e.g., a dropdown arrow associated with a particular context selection box 340, 344, etc.) from the interaction window 300 to customize the contextual data for presentation in an approval process. The contextual data presentation selection window 356 may include at least one of a header section 360, first contextual data selection type 368A, second contextual data selection type 368B, third contextual data selection type 368C, fourth contextual data selection type 368D, and more 376. Each contextual data selection type 368A-D may identify the included information and presentation type for contextual data presented to an approving user in an approval alert message. In some cases, a user may wish to be provided with all the information associated with a transaction, including custom contextual data. In this case, the first contextual data selection type 368A may be selected. In some cases a default selection may be made while in other cases a user input is required before a selection is made. When selected, an identification of the selected contextual data type 368A-D may be indicated by the respective highlighted identifier 372A-D. Among other things, the identifier 372A-D may serve to alert a user as to which contextual data type, if any, is selected. A highlighted identifier 372A-D may include a color, shading, name, symbol, code, number, and/or combinations thereof to identify the selected contextual data type. As shown in FIG. 3B the second contextual data selection type 368B is selected and the second identifier is shown in a highlighted, depressed, filled, colored, or otherwise selected condition.

Figure 3C:
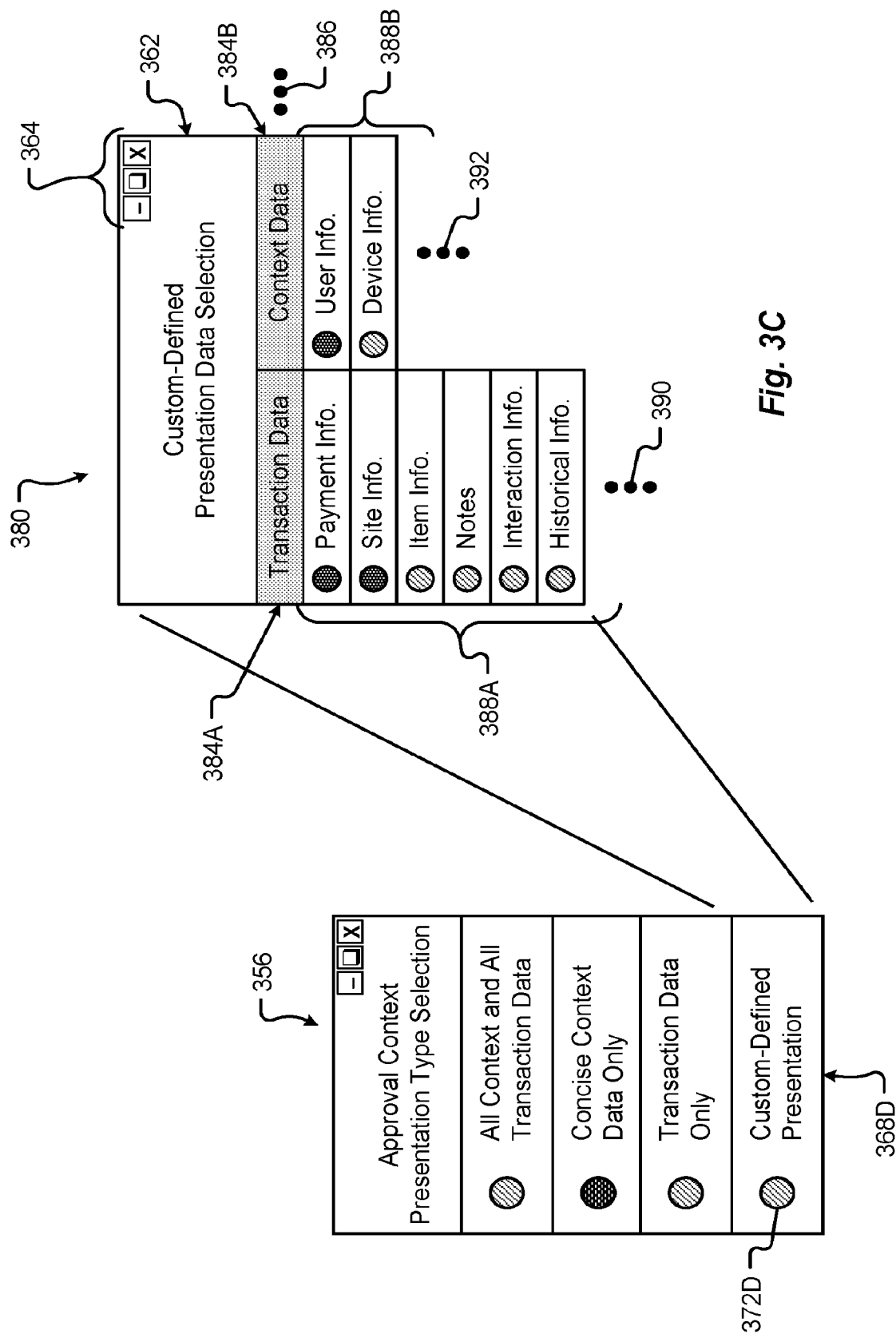
FIG. 3C is a representation of a graphical user interface of a combined data presentation selection window in accordance with embodiments of the present disclosure.

FIG. 3C is a representation of a graphical user interface of a custom-defined presentation data selection window 380 in accordance with embodiments of the present disclosure. In some embodiments, the custom-defined presentation data selection window 380 may be provided, presented, and/or displayed to a communication device 200 upon receiving a selection input from the contextual data presentation selection window 356 of the transaction interaction window 300. By way of example, a user may select to customize a presentation of data via selecting the custom-defined presentation type 368D. As described above, a user may select to include transaction and contextual data in a contextual approval presentation process. The configuration of the presentation of information may be customized via the custom-defined presentation type 368D. Upon selecting the custom-defined presentation type 368D, a number of options may be presented to the user for selection and/or verification. The options for presentation as shown in FIG. 3C may be separated by information type (e.g., transaction data 384A, transaction contextual data 384B, etc., or more 386). In some cases, a default selection of information may be preselected by the transaction application. In any event, the window 380 may receive a selection of one or more information types 388A, 388B, 390, 392 from a user. FIG. 3C shows selection highlighting that indicates the "Payment Info." and "Site Info." will be included in the approval presentation to represent transaction particular information, while the "User Info." will be included in the approval presentation on the contextual side. Although shown with three selections, it should be appreciated that a custom-defined presentation selection need not include any selection. Additionally or alternatively, the custom-defined presentation selection may include one or more selections made from one or more type columns 384A, 384B, 386.

Figure 4A:
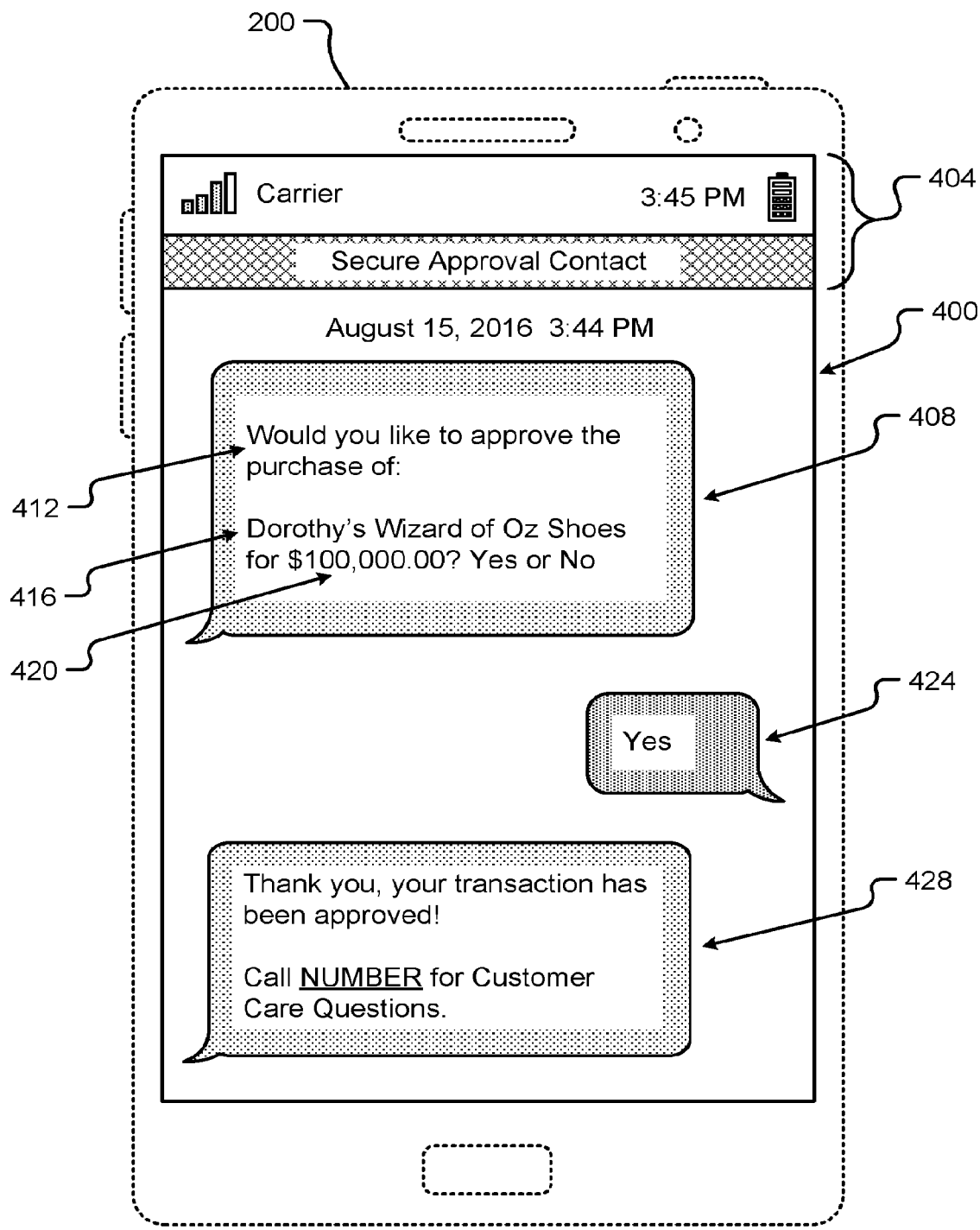
FIG. 4A is an illustrative screen-capture of a first contextual data presentation on a communications device in accordance with embodiments of the present disclosure.
Figure 4B:
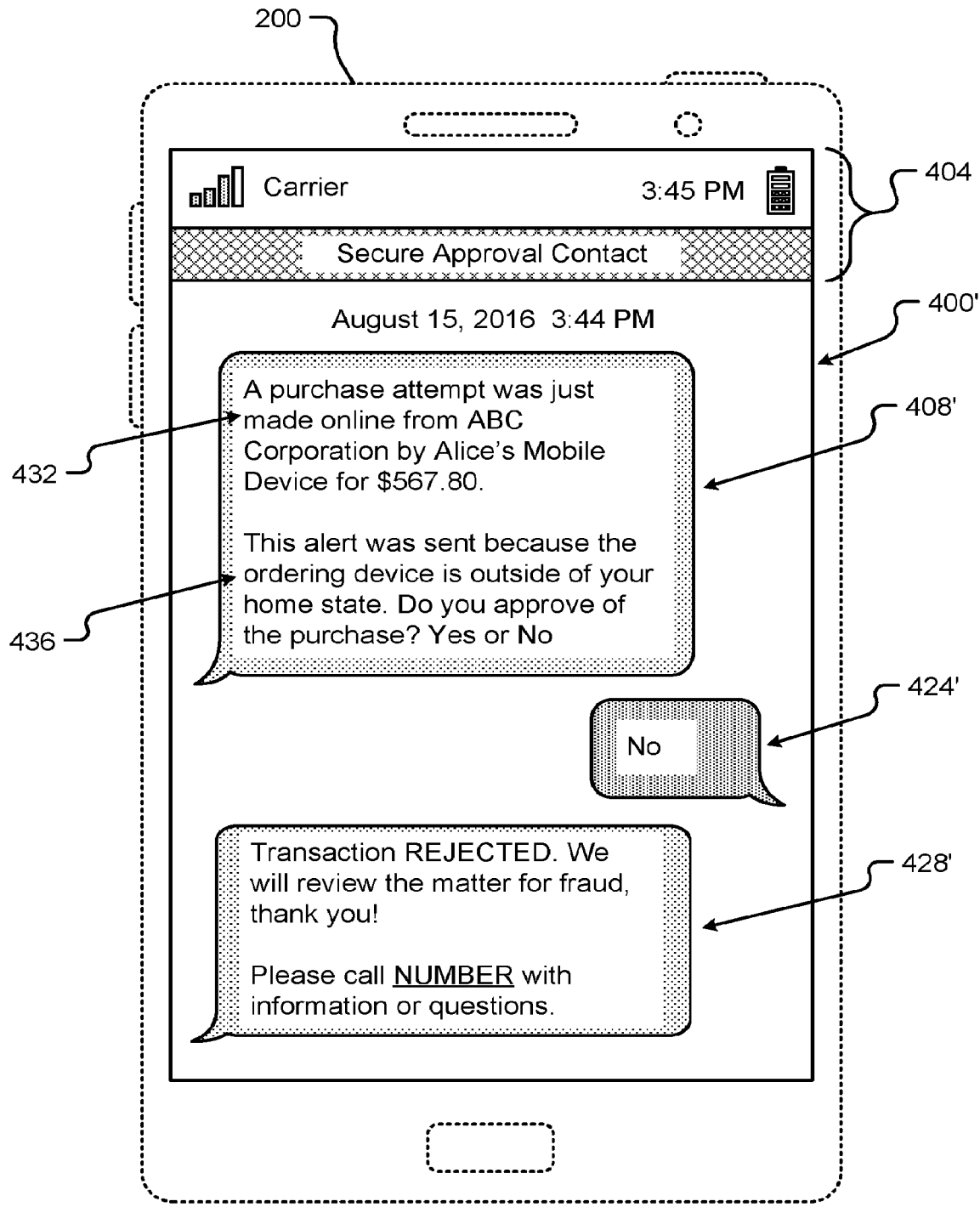
FIG. 4B is an illustrative screen-capture of a second contextual data presentation on a communications device in accordance with embodiments of the present disclosure.

FIGS. 4A-B show block diagrams depicting various contextual data presentations on a communications device 200 in accordance with embodiments of the present disclosure. Although these figures depict communications device 200 as displaying the information, it should be appreciated that the contextual data presentation, or contextual approval presentation, may be presented to any device 104, 108, etc. in the transaction communication system 100, 100'. In some embodiments, the communications device 200 may include at least one display 400, 400' and one or more device and/or communication identifiers 404. In FIG. 4A, a block diagram is shown depicting a first contextual data presentation on a communications device 200 in accordance with embodiments of the present disclosure. As shown in FIG. 4A, a first communication or challenge message 408 is shown including various contextual approval information 412, 416, 420.

In particular, the contextual approval information may include an approval prompt 412, the user-provided contextual approval data 416, an amount or transaction particular 420, and an approval selection text (e.g., "Yes or No," etc.). The user-provided contextual approval data 416 may correspond to the custom contextual data provided during the transaction as described herein and in conjunction with FIGS. 1A-3. Although shown including at least one transaction particular (i.e., the amount of "$100,000.00"), the transaction particular may not be required for approval or presentation via the contextual data presentation message 408.

A user receiving the message 408 may respond to, among other things, approve or deny the transaction. The user response 424 may include the approval response (e.g., "Yes") the denial response (e.g., "No") and/or an inquiry response configured to inquire as to additional details associated with the transaction (e.g., "More Info Needed," or "What?", or "?", etc.). As described herein, an inquiry response may direct the transaction application or transaction server 120 to provide additional details associated with the transaction in a subsequent message communicated to the communications device 200. These additional details may include further user-provided contextual data, transaction contextual data, transaction particulars, combinations thereof and/or the like. In the event that a user approves of the transaction (e.g., via an approval response, etc.) the transaction server 120 may provide acknowledgement (e.g., in the form of an acknowledgment message 428 displayed to the device 200) of the approval and determine to process the transaction.

FIG. 4A may correspond to a user-initiated-user-approved transaction scenario as described in conjunction with FIG. 1A. For instance, the transaction may be initiated by a user on a first device and approved by the user via a second device. This type of arrangement allows for additional security in approving transactions by requiring an approval input or response entered from a device that is independent from, separate from, and/or not associated with the transaction ordering device.

FIG. 4B is a block diagram depicting a second contextual data presentation on a communications device in accordance with embodiments of the present disclosure. The approval challenge message 408' shown in FIG. 4B includes a transaction particulars section 432 describing a transaction mode (e.g., online), a transaction site/location (e.g., ABC Corporation), a device identification (e.g., Alice's Mobile Device), and an amount (e.g., $567.80). In addition, the approval challenge message 408' includes a rule violation trigger definition 436 describing why the approval challenge message was issued and/or why the rule was violated. For example, the rule violation trigger definition 436 states that the alert was sent because the ordering device (i.e., Alice's Mobile Device) was outside of the user's home state. This information may be useful to a user in determining whether a transaction approval should be issued. For instance, when a particular user or user associated with an ordering device is not traveling, then any purchases made outside of a local (e.g., home or non-travel location, etc.) may be denied with confidence. Conversely, when the user or user associated with the ordering device is traveling, then the user may approve the challenge message 408'.

In some embodiments, the user may identify (e.g., in an approval, or other, response, etc.) that the rule violation trigger used to send the approval challenge message 408' should be relaxed, stayed, or otherwise deactivated for a period of time. This scenario may apply to a user who is traveling (e.g., on vacation, business, etc.) for a period of time and may wish to no longer receive approval challenges for transaction made in the particular or general location used in the rule violation trigger. Upon receiving the approval response and rule violation trigger update from the user (e.g., via the communications device 200), the transaction server 120 and/or transaction application may update the rule violation trigger for the specified period of time or time while the user is in the location. This rule violation trigger update is not only limited to location triggers but may also include, without limitation, transaction habit or behavior violations, transaction frequency violations, transaction preference violations, user preference violations, payment violations, etc., and/or combinations thereof.

Similar to the message 400 described in conjunction with FIG. 4A, the approval challenge message 408' of FIG. 4B may include an approval prompt, user provided or transaction contextual approval data 416, an amount or transaction particular, and an approval selection text (e.g., "Yes or No," etc.). As provided above, the contextual approval data 416 may correspond to the user-provided contextual data provided during the transaction as described herein and in conjunction with FIGS. 1A-3. One or more user-provided or transactional contextual data and/or transaction particular may not be required for approval or presentation via the contextual data presentation, or challenge message 408'.

In some embodiments, a user receiving the message 408' may respond to, among other things, approve or deny the transaction. The user response 424' may include an approval response (e.g., "Yes"), a denial response (e.g., "No"), and/or an inquiry response configured to inquire as to additional details associated with the transaction (e.g., "More Info Needed," or "What?", or "?", etc.). As described herein, an inquiry response may direct the transaction application or transaction server 120 to provide additional details associated with the transaction in a subsequent message communicated to the communications device 200. These additional details may include further user-defined or transactional contextual data, transaction particulars, combinations thereof and/or the like. In the event that a user denies of the transaction (e.g., via a denial response 424', etc.) the transaction server 120 may provide acknowledgement of the denial (e.g., in the form of an acknowledgment message 428').

FIG. 4B may correspond to a first-user-initiated-second-user-approved transaction scenario as described in conjunction with FIG. 1B. For instance, "Alice's Mobile Device" may associated with a first user, "Alice." In one embodiment, certain transactions made by the first user "Alice" may require approval of a second user (e.g., the user of the communications device 200 in FIG. 4B). This required approval may be based on rules, preferences, administrative privileges, etc. Among other things, this scenario allows a primary or administrative user to verify, validate, and/or approve transactions of subordinate users, etc.

Figure 5:
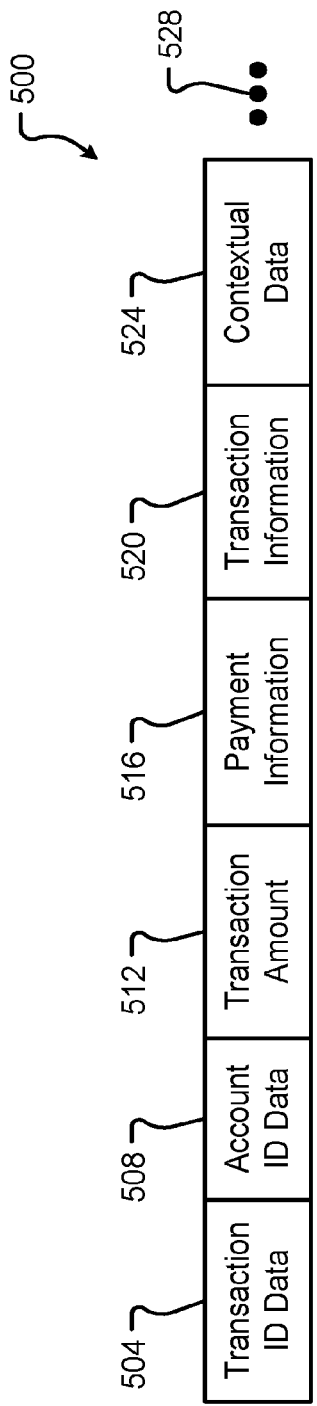
FIG. 5 is a diagram of an embodiment of a data structure for storing information about an initiated transaction in accordance with embodiments of the present disclosure.

FIG. 5 is a diagram of an embodiment of a data structure 500 for storing information about an initiated transaction in accordance with embodiments of the present disclosure. In some embodiments, the data structure 500 may be generated by a transaction application (e.g., executed by transaction server 120) during a transaction. The data structure 500 may include transaction-specific information 504-520 and/or contextual approval information 524. In some embodiments, this information may be provided as part of a user interacting with the GUI and one or more interface windows 300, 356, 380, as shown and described in conjunction with FIGS.

3A-3C, during a transaction. The transaction-specific information may include a transaction identification data field 504, an account identification data field 508, a transaction amount field 512, a payment information field 516, a transaction information field 524, etc. These transaction-specific information fields 504-520 may correspond to the transaction particulars associated with a transaction as described herein. For instance, the transaction-specific information fields 504-520 described in conjunction with FIGS. 5 and 6 may include information taken from the transaction summary 308, total cost 312, payment information 320, transaction site 304, and/or other portions of the transaction interface window 300 except the contextual approval information area 336 described in conjunction with FIG. 3A. The contextual approval information may include one or more contextual data fields 524, 528. The contextual data field 524 may include information corresponding to the user-defined contextual data provided during the transaction as described herein and in conjunction with FIGS. 1A-4B. For example, the contextual data field 524 may include contextual data provided by a user interacting with the GUI and one or more interface windows 300, 356, 380, as shown and described in conjunction with FIGS. 3A-3C, during a transaction.

The transaction identification data field 504 may include information corresponding to a unique identifier of the transaction. A unique identifier may include an order number, processing number, transaction descriptor, numeric identifier, symbolic identifier, alphanumeric identifier, character, combination of characters, etc., and/or the like. A typical transaction identification may include a system generated or user-defined transaction identifier. In any event, the transaction identification data field 504 may be used to identify one transaction from another in a number of transactions.

The account identification data field 508 may include information associated with at least one account used in the transaction. The account may be associated with at least one site, business, entity, and/or user. Account identification may be used to determine historical account information, order behavior, preferences, authorization, and/or some other information associated with the account.

The transaction amount field 512 may include information corresponding to at least one amount associated with the transaction. The amount may correspond to an amount of one or more items, total, discounts, cost, calculated amounts, currency type, tax rates, and/or other amount information associated with the transaction. The transaction amount field 512 may include individual line item costs (e.g., Cost 1, Cost 2, and Cost 3, as shown and described in conjunction with FIG. 3A). Additionally or alternatively, the transaction amount field 512 may correspond to a total cost 312 for the transaction, as described in conjunction with FIG. 3A. By way of example, the transaction may include a total cost for the transaction (e.g., Grocery purchase for $304.50, etc.).

The payment information field 516 can include transactional payment information associated with a user or entity engaging in the transaction. Payment information may include one or more payment type, payment account number, payment verification numbers, payor name, authorization, credit limit, cryptographic payment information, etc. This information may be provided and/or retrieved from the payment information area 320 of the transaction interaction window 300 described in conjunction with FIG. 3A.

The transaction information field 520 may include other transaction particulars, data, or metadata associated with the transaction, and/or the like. Data or metadata associated with the transaction may include transaction-initiating device identification, device location, device state, time of transaction, length of time in transaction, etc. For instance, the data or metadata associated with the transaction may be obtained when a user is interacting with, or has interacted with, a transaction interface window 300 as described in conjunction with FIG. 3A. In some embodiments, these other transaction particulars, data, or metadata may be presented to a communications device 200 of a user as an approval challenge.

The contextual data field 524 includes user-defined and transactional contextual data for approval and/or unique identification of the transaction. This contextual data may be text or other data that a user can add to the transaction which may then be used when reporting and authenticating or validating the transaction. The contextual data may be provided by a user interacting with the GUI and one or more interface windows 300, 356, 380, as shown and described in conjunction with FIGS. 3A-3C, during a transaction. For instance, the contextual data field 524 may include the custom contextual data provided by a user interacting with the contextual approval information area 336, or one or more entry fields 340, 344, of the transaction interaction window 300 during a transaction. In some embodiments, this contextual data field 524 is bound to the transaction, in that the entire data (e.g., the transaction information and the contextual data) is cryptographically signed and/or encrypted. The user-defined and transaction contextual data may be sent to the transaction server 120 and can be presented whenever information about the transaction is presented to the end user/customer. For example, a user making a purchase on the Internet may be given the opportunity to label the purchase with contextual data, such as, "Dorothy's Wizard of Oz Shoes." Instead of sending only the traditional transactional data, the user-defined contextual data could be sent to the server (signed by the application private key) and then sent to the mobile application to (1) present the custom contextual data and (2) validate the private key by decrypting the data with the public key. As can be appreciated, this approach can reduce message payloads and processor requirements (and even reduce user confusion) when sending the condensed message including the contextual data string and leaving off the other private data (e.g., where: Kmart, date: 17 July, amount: $105.95) by sending just the encrypted private text for approval.

Figure 6:
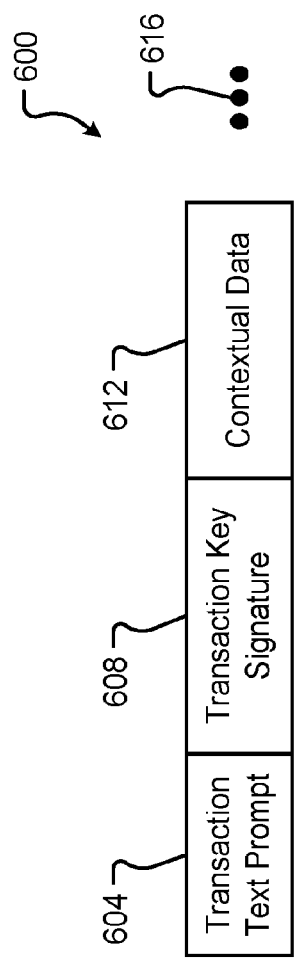
FIG. 6 is a diagram of an embodiment of a data structure for storing information about a transaction presentation associated with a transaction in accordance with embodiments of the present disclosure.

FIG. 6 is a diagram of an embodiment of a data structure 600 for storing information about a transaction presentation associated with a transaction in accordance with embodiments of the present disclosure. The data structure 600 shown in FIG. 6 may correspond to information included in an approval challenge message sent to a user device, or communications device 200, from the transaction server 120. The data structure 600 may include a number of fields including, but in no way limited to, a transaction text prompt field 604, transaction key signature field 608, contextual data field 612, and more 616.

The transaction text prompt field 604 may include template information used in sharing transaction information. Sharing transaction information may include, but is in no way limited to, posting transaction information to a third party site, social networking site, or group. Additionally or alternatively, sharing the transaction information may include presenting the transaction information in an approval challenge message format to a user device. In any event, the template information may configure text to setup the presentation of contextual data. For example, the prompt may precede or follow user-provided contextual data in a presentation of information. In a social networking scenario, the prompt may state, for example, "I just bought" which would be followed by the user-provided contextual data associated with the transaction. In an approval challenge message scenario, the prompt, or a portion of the prompt, may provide "A purchase was just made for" followed by the user-provided contextual data associated with the transaction. In one embodiment, this presentation may be followed by another portion of the prompt that defines an acceptable approval or denial response, such as "do you approve of this purchase? Yes or No." The total prompt would then provide "A purchase was just made for [user-provided contextual data] do you approve of this purchase? Yes or No." As can be appreciated, any number of combinations of prompts and/or prompt templates may be used to frame or otherwise structure a presentation of information associated with the transaction and/or contextual data.

In some embodiments, the data structure 600 may provide a key signature for the transaction in a transaction key signature field 608. The transaction key signature field 608 may include a public key along with a private key signature. In any event, the key or key signature may be used to verify an authenticity of the approval challenge message and/or the transaction.

The contextual data field 612 may be similar, if not identical, to the contextual data field 524 described in conjunction with FIG. 5. The contextual data field 612 may include user-defined contextual data that identifies the transaction to the user. The contextual data field 612 may include transaction contextual data. This contextual data may be combined with transaction information or transaction particulars in the contextual data field 612. In some embodiments, the contextual data field 612 may include only the user-defined contextual data. In some cases, the contextual data may be combined with a stripped down version, or limited amount, of transaction-specific information 504-520. Alternatively, the contextual data field 612 may include user-defined or transactional contextual data combined with only one other transaction-specific information (e.g., amount, transaction location, etc.). It is an aspect of the present disclosure that the data in the contextual data field 612 is designed to identify a transaction using unique user-defined approval information without requiring transaction-related information.

Figure 7:
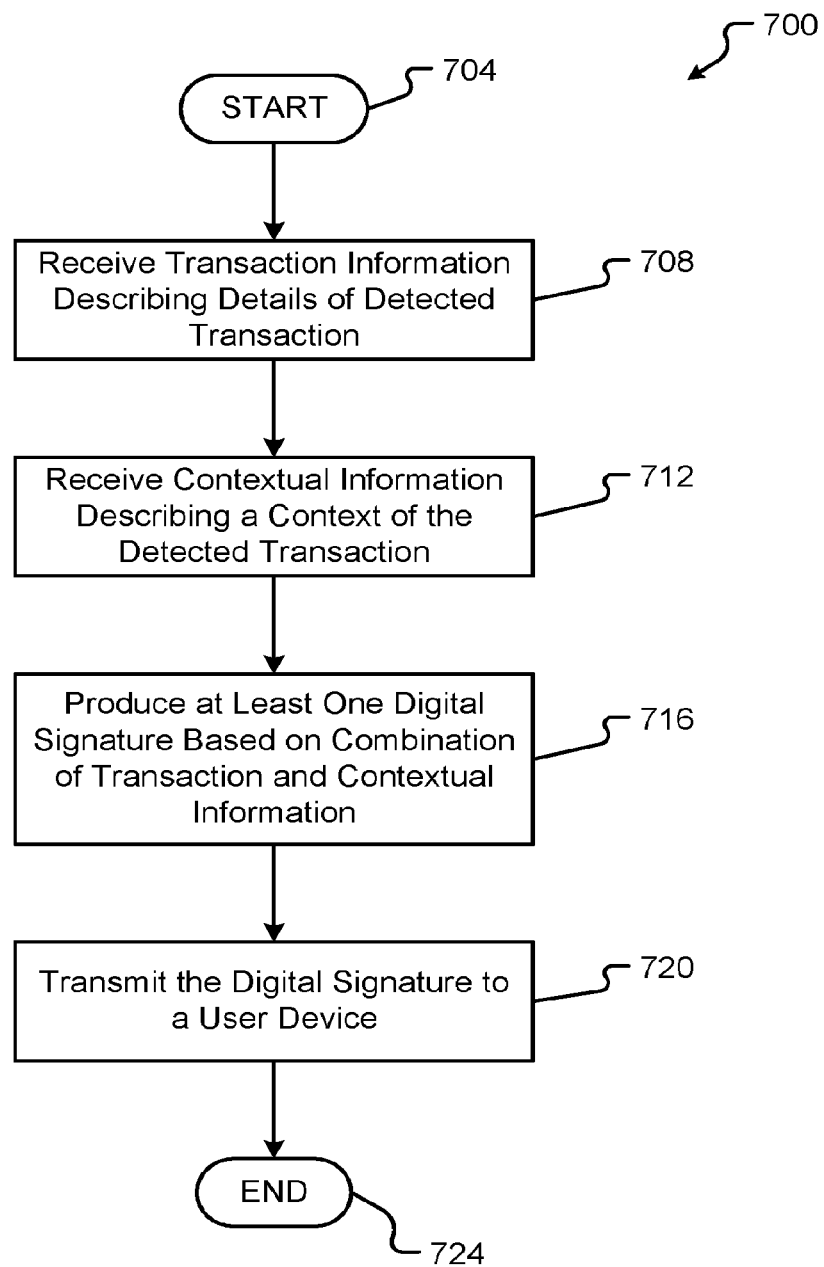
FIG. 7 is a flow chart depicting a first method of approving a transaction based on a contextual data presentation in accordance with embodiments of the present disclosure.

FIG. 7 is a flow chart depicting a first method 700 of approving a transaction based on a contextual data presentation in accordance with embodiments of the present disclosure. While a general order for the steps of the method 700 is shown in FIG. 7, the method 700 can include more or fewer steps or can arrange the order of the steps differently than those shown in FIG. 7. Generally, the method 700 starts with a start operation 704 and ends with an end operation 724. The method 700 can be executed as a set of computer-executable instructions executed by a computer system and encoded or stored on a computer readable medium. Hereinafter, the method 700 shall be explained with reference to the systems, components, user interfaces, environments, software, etc. described in conjunction with FIGS. 1-6.

The method 700 begins at step 704 and proceeds when transaction information is received describing the details of a detected transaction (step 708). In some embodiments, the transaction information may be provided by a user, via a communication device 104 or portable device 108, interacting with a transaction application and initiating a transaction. The transaction information may be received by a transaction server 120 or at some other device executing a transaction application. The transaction information may include one or more transaction-specific particulars, as described above, that are associated with the transaction. These particulars may include, but are in no way limited to, transaction items, descriptions, amounts, costs, totals, order identification, payment method, payment identification, user identification, etc.

Next, the method 700 continues when contextual data describing a context of the detected transaction is received (step 712). Steps 708 and 712 may occur simultaneously or sequentially in any order (e.g., step 712 may occur before step 708). The contextual data may include transaction contextual data. The contextual data may include user-defined, and/or automatically generated, user approval contextual data. As described above, the user approval contextual data may include information (e.g., in the form of text, description, etc.) that identifies the transaction to the user. The user approval contextual data may include information that is related to transaction particulars or that is unrelated to the transaction particulars. For example, user approval contextual data that describes a transaction using synonyms, root words, and/or derivatives of words in transaction particulars may be considered as related. By way of example, a user may provide user approval contextual data of "dancing shoes" to represent a purchase transaction of women's red shoes, size 8, for $120. As illustrated in this example, the word "shoes" is used in both the transaction particulars and the user approval contextual data. In this example, the user approval contextual data is related to the transaction particulars. On the other hand, a user may provide user approval contextual data of "dancing in style" to represent the purchase transaction of women's red shoes, size 8, for $120. In this example, there is no relationship, or known relation, between the contextual data (i.e., "dancing in style") and the transaction particulars (e.g., "women's red shoes, size 8, for $120"). However, in this example, the user is aware that the user approval contextual data is associated with the shoe purchase. In any event, the user approval contextual data may be used to identify a transaction to a user for approval.

The method 700 may then produce at least one digital signature based on a combination of transaction and contextual data (step 716). The digital signature may include signing at least one of the transaction and contextual data with a key associated with a transaction application. The transaction application may be configured to run on one or more of the communication device 104, portable device 108, and/or the transaction server 120.

In some embodiments, the method 700 may include sending the digital signature to a user device (step 720). The user device that receives the digital signal may include any type of portable device 108 or similar type of computing device employed by a user. The user device to which the digital signature is sent may be operated by a different user that is required to validate a transaction. As an example, a second party may be required to additional consent in order to approve/complete a transaction. This type of transaction may be considered to require a chained approval with a shared context. As a more specific example, a CEO may approve a "September pay roll" already approved by Finance or a parent may approve a "present for mom" initiated by an already-approved child. Among other things and to facilitate such a transaction, the digital signature may be accompanied by the contextual data (e.g., custom user approval text, etc.) and configured to validate the private key by decrypting the contextual data and/or transaction data using a public key associated with the user device and/or application running via the user device. In some embodiments, symmetric key encryption may be employed such that transaction data may be protected for confidentiality and integrity by pre-shared keys between the server and an application. As can be appreciated, this method 700 allows for only the encrypted private text (e.g., contextual data) to be sent to the user device for approval without other private transaction data or transaction particulars (e.g., price, location, date, etc.). The method 700 ends at step 724.

Figure 8:
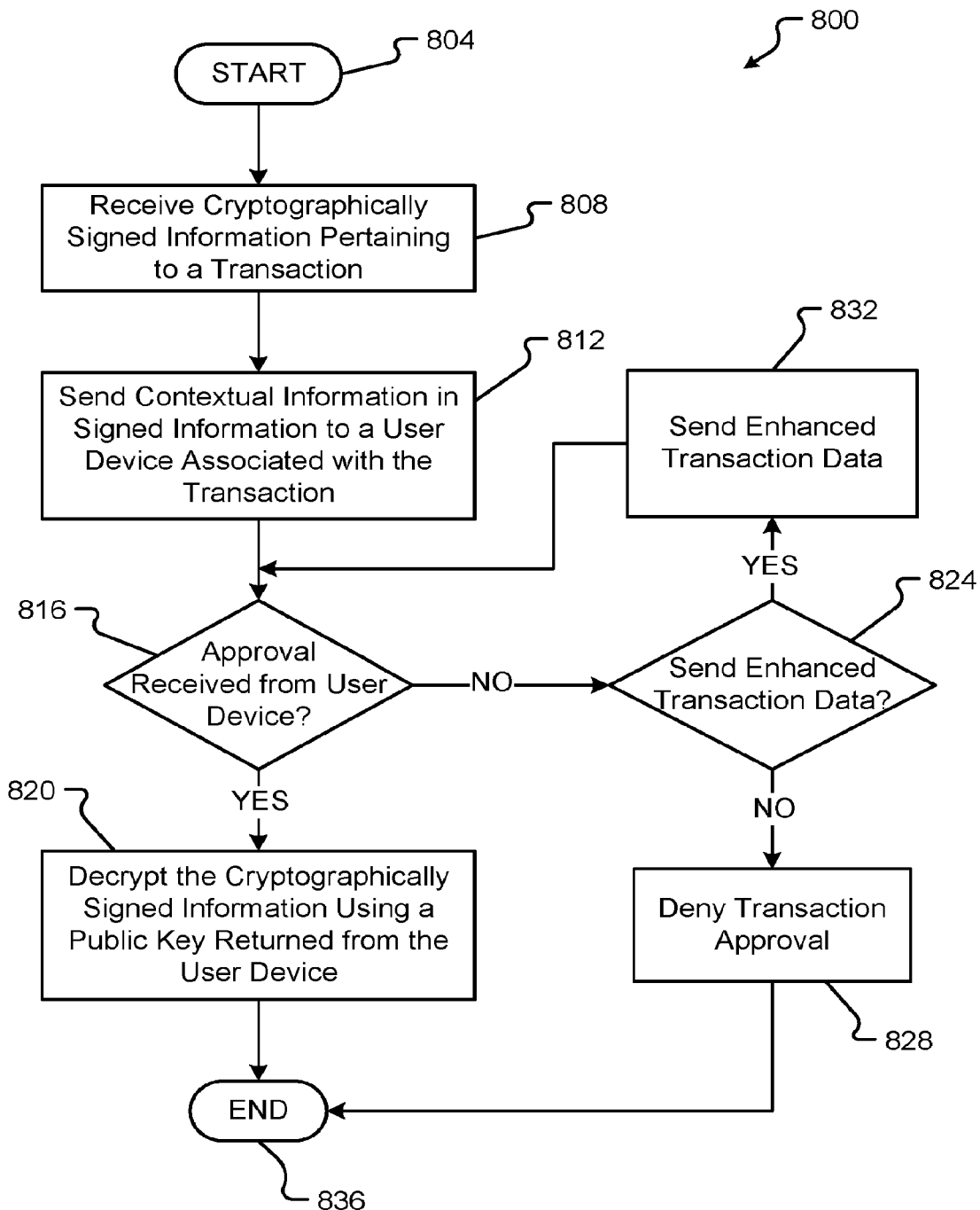
FIG. 8 is a flow chart depicting a second method of approving a transaction based on a contextual data presentation in accordance with embodiments of the present disclosure.

FIG. 8 is a flow chart depicting a second method of approving a transaction based on a contextual data presentation in accordance with embodiments of the present disclosure. While a general order for the steps of the method 800 is shown in FIG. 8, the method 800 can include more or fewer steps or can arrange the order of the steps differently than those shown in FIG. 8. Generally, the method 800 starts with a start operation 804 and ends with an end operation 836. The method 800 can be executed as a set of computer-executable instructions executed by a computer system and encoded or stored on a computer readable medium. Hereinafter, the method 800 shall be explained with reference to the systems, components, user interfaces, environments, software, etc. described in conjunction with FIGS. 1-7.

The method 800 begins at step 804 and proceeds by receiving cryptographically signed information pertaining to a transaction (step 808). In some embodiments, the cryptographically signed information may be received by a transaction server 120 across a communication network 116. The cryptographically signed information may correspond to information generated by a user initiating a transaction via a communication device. In any event, the cryptographically signed information may include a combination of transaction data and user approval contextual data.

In some embodiments, a transaction may be evaluated to determine whether approval of the transaction is required. Certain transactions or conditions associated with a transaction may require an approval challenge, or contextual data approval, message to be sent to a user device for approval. Sending the message may be based on rules stored in memory (e.g., transaction data memory 124, etc.), preferences, and/or administrative rules. The rules may define that the transactions or conditions present a scenario where one or more of nonrepudiation, approval, or validation of a transaction is required. In some embodiments, the rules may include a rule violation trigger that defines when a rule defining non-approval conditions is violated. For example, a rule may state that transactions initiated by a specific user, in a specific location, and/or from a specific user device may be authorized. However, if the rule is violated (e.g., when a user device is not in a specific location, etc.) the contextual approval message may be required to be sent for approval before the transaction is allowed. The approval message may contain the rule violation trigger.

The method 800 may continue by separating the contextual data (e.g., the user approval contextual data) from the transaction data received as part of the cryptographically signed information. Next, the method 800 proceeds by sending the separated contextual data to a user device associated with the transaction (step 812). This contextual data may be sent alone (e.g., without additional transaction information, etc.) or along with a portion of the transaction information. In some embodiments, a template or prompt (e.g., as described in conjunction with FIGS. 4A, 4B, and 6, etc.) may define what, if any, transaction information should be included in a message sent to the user device. In some embodiments, the contextual data sent to the user device may be cryptographically signed using a private key associated with the initiated transaction or transaction application.

In some embodiments, the contextual data may be sent as part of a message that is configured to present the contextual data to a display associated with the user device. The message may be configured as an approval challenge message as described in conjunction with FIGS. 4A, 4B, and 6.

Upon receiving a response to the message (e.g., from a user device, etc.), the method 800 may proceed at step 816 by determining whether the response is an "approval" response or some other response (e.g., inquiry response, denial response, etc.). An approval response may correspond to any response accepted by the transaction server 120 indicating that the user and user device accepts or validates the transaction. In the event that the approval is received, the method 800 may continue by decrypting the cryptographically signed information and/or contextual data (step 820). In one embodiment, the approval/deny response may be included in the signature message sent to the server and verified by the server. In some cases, the decryption may be performed by the transaction server 120 using a public key provided by the user device as part of the acceptance/approval response or obtained in previous steps during an "enrollment phase" of the user device keys.

In the event that an approval is not received at the transaction server 120, the method 800 may continue by determining whether to send enhanced transaction data to the user device (step 824). This determination may include analyzing a type of response received from the user device. For instance, if the response is an inquiry response, the method 800 may determine to provide transaction data, or additional transaction data, to better inform the user of the transaction specifics associated with the transaction (step 832). Sending enhanced transaction data may include the transaction server 120 referring to the transaction information associated with the transaction that was excluded from the previous message or messages. The server 120 may select one or more portions of the previously excluded transaction information to add to a new message for the user device. By way of example, in one embodiment, or iteration, of sending enhanced transaction data, the transaction server 120 may include the total price of the transaction. In another embodiment, or second iteration, of sending enhanced transaction data, the transaction server 120 may include the transaction location in the message. The method 800 may continue to repeat, or iterate, and add transaction information to new messages sent to the user device whenever an inquiry response is received from the user device. As can be appreciated, this iterative process may continue until all transaction information has been sent and/or presented to the user device.

However, when the response from the user device is a timeout response (e.g., a lack of response, delayed response, etc.) or a denial response, the method 800 may proceed to deny approval for the transaction (step 828). Denying the approval for the transaction may include sending confirmation or acknowledgement of the denial to the user device. In some embodiments, the denial may include promoting or maintaining a rule violation trigger that caused the contextual approval message to be sent. In any event, the method 800 ends at step 836.

Figure 9:
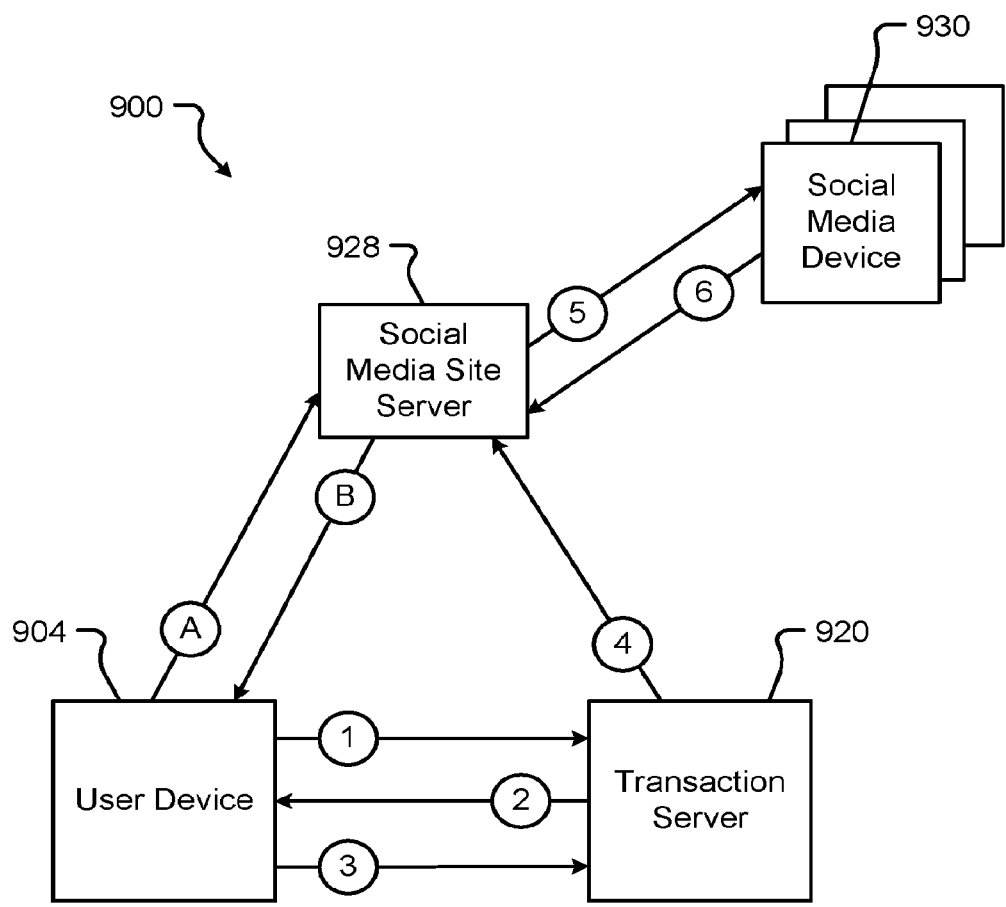
FIG. 9 is a block diagram of a contextual data sharing process in accordance with embodiments of the present disclosure.

Referring now to FIG. 9, a block diagram of a contextual data sharing process 900 is shown in accordance with embodiments of the present disclosure. In some embodiments, the diagram in FIG. 9 may illustrate a typical process 900 of sharing contextual data with one or more social connections. The social connections may be associated with one or more social media sites and/or servers and may be associated with a user engaging in a transaction. For example, the process 900 may begin at step 1 when a user initiates a transaction at a transaction server 920 via a user device 904. The transaction server 920 described in conjunction with FIG. 9 may be similar, if not identical, to the transaction server 120 described in conjunction with FIGS. 1A-1B and elsewhere as described herein. The user device 904 may be a similar, if not identical, device as the communication device 104 and/or the portable device 108 as described above. Initiating a transaction may include, but is in no way limited to, contacting the transaction server 920, placing an order, adding items to a cart, making a purchase, and/or otherwise setting up a transaction for completion, etc.

The process 900 continues when the transaction server 920 returns or presents information concerning the transaction to the user device 904, or a display device associated with the user device 904 (step 2). The information may include one or more of a transaction particular, such as, transaction description, an amount, an item, a payment, a site identifier, and a template, and/or user defined or transaction contextual data. In some embodiments, the transaction server 920 may provide a contextual data sharing option (e.g., a selection box, a popup, and/or some other user input interface element, etc.) configured to receive input from a user via the user device 904. The contextual data sharing option may include custom contextual data provided by a user during the transaction in a sharing format template. This template may be similar, if not identical, to the templates described above.

The user may select, at step 3, to share the contextual data via an input provided at the contextual data sharing option presented to the user device 904. The sharing input may indicate one or more social networking site, template message, and/or other sharing information to use when sharing the contextual data with one or more social connections to the user.

In response, the transaction server 920 may contact a social media site server 928 associated with the user controlling the user device 904 (step 4). In some embodiments, the transaction server 920 may provide a username and/or password to the social media site server 928 to access the user's account for sharing the contextual data for the transaction. In some embodiments, the transaction server 920 may provide an authorization token to the social media site server 928 to access the user's account for sharing the contextual data for the transaction. This authorization token may be a token used in the open standard for authorization (OAuth) protocol. For instance, at some point surrounding the transaction, the user of the user device 904 may be authenticated with the social media site server 928 via providing identification information (step A) and receiving an access token response (step B) including the access token. This authentication process may be provided directly between the user device 904 and the social media site server 928 (e.g., via one or more applications running thereon) and/or indirectly via the transaction server 920 relaying information between the user device 904 and the social media site server 928 (e.g., via one or more applications running thereon).

In some embodiments, the transaction server 920 may provide the shared contextual data (e.g., in the form of a template message) to the social media site server 928 as a concurrent or subsequent message to the authorization established in step 4.

Once the transaction server 920 is authorized to gain access to the user's social media, the shared contextual data and/or template message including the shared contextual data may be posted to the user's social networking wall, page, or site. The shared contextual data may contain the user-provided contextual data. In some embodiments, the shared contextual data and/or template message may be pushed to one or more social media devices 930 associated with users who are socially connected to the user of the user device 904 engaging in the transaction (step 5). Additionally or alternatively, one or more social media devices (e.g., associated with users who are socially connected to the user of the user device 904, etc.) may access the social media site server 928 to view, or even pull, the shared contextual data and/or template message (step 6).

It is an aspect of the present disclosure that users of the social media devices may comment on, approve of, and/or otherwise provide input regarding the transaction described or identified via the shared contextual data and/or template message. In one example, a user of the user device 904 may wish to have input on a transaction before making a purchase. In this case, the user may select a template that states "I am thinking of buying "[ ]" from "Transaction Site X," where the user-provided contextual data (e.g., user-customized text, etc.) entered by the user to identify the transaction may be substituted in for the "[ ]" characters and the actual name of the transaction site may be included in the "Transaction Site X" portion. Once provided to the social media site server 928 as described above, the user may receive comments from other users socially connected to the user about the transaction site and/or the user-provided contextual data. Continuing this example, a social connection may provide input such as, "don't buy from that transaction site" or "the [ ] is not reliable," or "that is a great idea," or "congratulations," etc. In any event, the user may determine to continue with or terminate the transaction based at least partially on the comments received from the social connection. In some embodiments, the template message including the user-provided contextual data may be provided to the social media site server 928 to inform others of a transaction already made by the user.

The exemplary systems and methods of this disclosure have been described in relation to communications devices, systems, and methods in a transaction communication system. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should, however, be appreciated that the present disclosure may be practiced in a variety of ways beyond the specific detail set forth herein. Moreover, it should be appreciated that the methods disclosed herein may be executed via a portable device, a wearable device, a reading device, a communication device, and/or an access server of an access control system, etc.

Furthermore, while the exemplary aspects, embodiments, options, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

Optionally, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Embodiments include a method of producing a message in connection with a detected transaction, the method comprising: receiving transaction information that describes details of the detected transaction; receiving contextual information that describes a context of the detected transaction; producing at least one digital signature based on a combination of the transaction information and the contextual information; and transmitting the digital signature in a message to a server.

Aspects of the above method include wherein the at least one digital signature comprises a first cryptographic signature of the transaction information and a second cryptographic signature of the contextual information. Aspects of the above method include wherein the at least one digital signature comprises a cryptographic signature of the transaction information as well as the contextual information. Aspects of the above method include wherein the contextual information comprises a location of the detected transaction. Aspects of the above method include wherein the contextual information comprises a description of the transaction generated by a person that initiated the detected transaction. Aspects of the above method include wherein the server forwards at least a portion of the message to a user of a user device, wherein the at least a portion of the message forwarded includes a request for the user to verify the detected transaction and further provides a description of the contextual information. Aspects of the above method include wherein the contextual information comprises a transaction history for a person that initiated the detected transaction, the transaction history including details about transactions other than the detected transaction. Aspects of the above method include wherein the message is formatted for delivery to a social media profile associated with a person that initiated the detected transaction such that the social media profile associated with the person that initiated the detected transaction displays the transaction information and/or the contextual information. Aspects of the above method include wherein the message is transmitted in one or more communication packets over a packet-based communication network. Aspects of the above method further comprise: generating a template that includes automatically generated text based on the detected transaction; allowing a person that initiated the transaction to edit the template with additional custom information; and including the edited template as part of the contextual information.

Embodiments include a server, comprising: a processor; and a computer-readable storage medium having instructions stored thereon that, when executed by the processor, cause the processor to: receive transaction information describing details of a detected transaction; receive contextual information describing a custom user-generated context for the detected transaction; and transmit a cryptographically signed and/or encrypted challenge message including the custom user-generated context to a user device.

Aspects of the above server include wherein the processor is further caused to: receive a signed and encrypted response to the challenge message, wherein the response includes an approval or denial of the detected transaction based on the custom user-generated context. Aspects of the above server include wherein the processor is further caused to: receive a signed and encrypted response to the challenge message; and decrypt and verify the received signed and encrypted response. Aspects of the above server include wherein the cryptographically signed and/or encrypted challenge message including the custom user-generated context is configured for presentation to a display of the user device. Aspects of the above server include wherein the cryptographically signed and/or encrypted challenge message excludes information about the transaction other than the custom user-generated context. Aspects of the above server include wherein the processor is further caused to: receive a response to the challenge message, wherein the response includes an inquiry requesting more information regarding the transaction detected before approval of the transaction is allowed. Aspects of the above server include wherein the response is signed and/or encrypted. Aspects of the above server include wherein in response to receiving the inquiry requesting more information regarding the transaction detected, the processor is further caused to: transmit transaction information previously excluded from the cryptographically signed and/or encrypted challenge message in a subsequent cryptographically signed and/or encrypted challenge message.

Embodiments include a method comprising: detecting, at a transaction server, a transaction initiated by a first user device communicatively connected to the transaction server; determining, by the transaction server, a user-defined context describing the transaction detected; determining, by the transaction server, a second user device associated with the transaction detected; and transmitting, by the transaction server, the user-defined context describing the transaction detected to the second user device.

Aspects of the above method include wherein the transaction is initiated by a first user via the first user device and the second user device is associated with a second user, and wherein the second user is different from the first user. Aspects of the above method include wherein the user-defined context describing the transaction is provided by a first user and the user-defined context is configured to uniquely identify the transaction only to the first user. Aspects of the above method include wherein transmitting the user-defined context includes posting the user-defined context to a social networking website, and wherein the user-defined context is included as part of a template configured to present the user-defined context with at least one preceding template text or following template text.

Any of the steps, functions, and operations discussed herein can be performed continuously and automatically.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The invention claimed is:

1. A method, comprising:
   detecting, at a transaction server, a transaction initiated by a first user device communicatively connected to the transaction server;
   determining, by the transaction server, a user-provided contextual information describing the transaction detected, wherein the user-provided contextual information is based on a selection by a first user of the first user device, the selection indicating whether to use an automatic contextual information generation or a manual contextual information generation mechanism to generate the user-provided context, wherein in response to the selection being the manual contextual information generation, custom contextual data that is unrelated to the transaction information is used as the user-provided contextual information;
   determining, by the transaction server, a second user device associated with the transaction detected;
   signing, by the transaction server, the user-provided contextual information describing the transaction; and
   transmitting, by the transaction server, a message to the second user device, the message including the signed user-provided contextual information describing the transaction.

2. The method of claim 1, wherein the transaction is initiated by the first user via the first user device and the second user device is associated with a second user, and wherein the second user is different from the first user.

3. The method of claim 2, wherein the user-provided contextual information describing the transaction is provided by the first user and the user-provided contextual information identifies the transaction only to the first user.

4. The method of claim 2, wherein transmitting the user-provided contextual information describing the transaction includes posting the user-provided contextual information to a social networking website, and wherein the user-provided contextual information is included as part of a template configured to present the user-provided contextual information with at least one preceding template text or following template text.

5. A transaction server, comprising:
   a processor; and
   a computer-readable storage medium having instructions stored thereon that, when executed by the processor, cause the processor to:
   detect, at the transaction server, a transaction initiated by a first user device communicatively connected to the transaction server;
   determine, by the transaction server, a user-provided contextual information describing the transaction detected, wherein the user-provided contextual information is based on a selection by a first user of the first user device, the selection indicating whether to use an automatic contextual information generation or a manual contextual information generation mechanism to generate the user-provided context, wherein in response to the selection being the manual contextual information generation, custom contextual data that is unrelated to the transaction information is used as the user-provided contextual information;
   determine, by the transaction server, a second user device associated with the transaction detected;
   sign, by the transaction server, the user-provided contextual information describing the transaction; and
   transmit, by the transaction server, a message to the second user device, the message including the signed user-provided contextual information describing the transaction.

6. The transaction server of claim 5, wherein the transaction is initiated by the first user via the first user device and the second user device is associated with a second user, and wherein the second user is different from the first user.

7. The transaction server of claim 5, wherein the user-provided contextual information describing the transaction is provided by the first user and the user-provided contextual information identifies the transaction only to the first user.

8. The transaction server of claim 5, wherein transmitting the user-provided contextual information describing the transaction includes posting the user-provided contextual information to a social networking website, and wherein the user-provided contextual information is included as part of a template configured to present the user-provided contextual information with at least one preceding template text or following template text.

9. A non-transitory machine-readable medium including instructions, which when executed by a transaction server, cause the transaction server to perform operations comprising:
   detecting, at the transaction server, a transaction initiated by a first user device communicatively connected to the transaction server;
   determining, by the transaction server, a user-provided contextual information describing the transaction detected, wherein the user-provided contextual information is based on a selection by a first user of the first user device, the selection indicating whether to use an automatic contextual information generation or a manual contextual information generation mechanism to generate the user-provided context, wherein in response to the selection being the manual contextual information generation, custom contextual data that is unrelated to the transaction information is used as the user-provided contextual information;
   determining, by the transaction server, a second user device associated with the transaction detected;
   signing, by the transaction server, the user-provided contextual information describing the transaction; and
   transmitting, by the transaction server, a message to the second user device, the message including the signed user-provided contextual information describing the transaction.

10. The machine-readable medium of claim 9, wherein the transaction is initiated by the first user via the first user device and the second user device is associated with a second user, and wherein the second user is different from the first user.

11. The machine-readable medium of claim 9, wherein the user-provided contextual information describing the transaction is provided by the first user and the user-provided contextual information identifies the transaction only to the first user.

12. The machine-readable medium of claim 9, wherein transmitting the user-provided contextual information describing the transaction includes posting the user-provided contextual information to a social networking website, and wherein the user-provided contextual information is included as part of a template configured to present the user-provided contextual information with at least one preceding template text or following template text.

\* \* \* \* \*